(12) United States Patent
Nishimura et al.

(10) Patent No.: US 6,859,432 B2
(45) Date of Patent: Feb. 22, 2005

(54) PACKET SWITCH FOR PROVIDING A MINIMUM CELL RATE GUARANTEE

(75) Inventors: Kazuto Nishimura, Kawasaki (JP); Jun Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 802 days.

(21) Appl. No.: 09/794,471

(22) Filed: Feb. 27, 2001

(65) Prior Publication Data

US 2004/0202108 A1 Oct. 14, 2004

(30) Foreign Application Priority Data

Jun. 26, 2000 (JP) ........................................ 2000-191819

(51) Int. Cl.[7] .............................................. H04L 12/26
(52) U.S. Cl. .................................. 370/229; 370/230.1
(58) Field of Search ................................ 370/229, 230, 370/230.1, 360–395.1

(56) References Cited

U.S. PATENT DOCUMENTS

| | | | | |
|---|---|---|---|---|
| 6,144,636 A | * | 11/2000 | Aimoto et al. | 370/229 |
| 6,243,359 B1 | * | 6/2001 | Roy et al. | 370/230 |
| 6,330,240 B1 | * | 12/2001 | Kozaki et al. | 370/395.7 |
| 6,480,467 B1 | * | 11/2002 | Hernandez-Valencia | 370/230 |
| 6,501,731 B1 | * | 12/2002 | Chong et al. | 370/230.1 |
| 6,611,527 B1 | * | 8/2003 | Moriwaki et al. | 370/412 |
| 6,680,907 B1 | * | 1/2004 | Bonaventure | 370/229 |

* cited by examiner

Primary Examiner—Frank Duong
Assistant Examiner—Michael J. Moore
(74) Attorney, Agent, or Firm—Katten Muchin Zavis Rosenman

(57) ABSTRACT

A packet switch includes a memory unit for storing a flag for indicating a state of existence of a packet in a buffer memory, a peak cell rate packet interval value for restricting a read-out rate to a peak cell rate or under, and a minimum cell rate counter initial value expressed as a minimum cell rate in a way of making these parameters corresponding to every connection, a peak cell rate counter unit decremented by a predetermined value at every packet read-out timing with the peak cell rate packet interval value serving as an initial value, a minimum cell rate counter unit for retaining a value of a corresponding connection, which is decremented by a predetermined value each time the packet is read out of the buffer memory, and a read-out control unit for setting as a read-out target the packet corresponding to a connection exhibiting a maximum value of product of the maximum cell rate packet interval value and a value retained in the minimum cell rate counter unit at the packet read-out timing.

15 Claims, 31 Drawing Sheets

FIG. 1A  PRIOR ART

|  | VC#1 | VC#2 |
|---|---|---|
| PCR | 5Mb/s | 4Mb/s |
| MCR | 1Mb/s | 2Mb/s |

FIG. 1B  PRIOR ART

|  | VC#1 | VC#2 | VC#3 | VC#4 | VC#5 |
|---|---|---|---|---|---|
| PCR | 10M | 10M | 10M | 10M | 10M |
| MCR | 4M | 1M | 1M | 1M | 1M |
| MCR COUNTER | 4 | 1 | 1 | 1 | 1 |
| PCR SLOT INTERVAL | 2 | 2 | 2 | 2 | 2 |

FIG. 1C  PRIOR ART

|  | VC#1 | VC#2 | VC#3 |
|---|---|---|---|
| PCR | 10M | 10M | 10M |
| MCR | 6M | 5M | 4M |
| MCR COUNTER | 6 | 5 | 4 |
| PCR SLOT INTERVAL | 2 | 2 | 2 |

FIG. 1D  PRIOR ART

|  | VC#1 | VC#2 |
|---|---|---|
| PCR | 20M | 5M |
| MCR | 10M | 3M |
| MCR COUNTER | 10 | 3 |
| PCR SLOT INTERVAL | 1 | 4 |

※TOTAL CELL RATE=20Mb/s

VC INFORMATION MEMORY

| VC NUMBER | BUFFER FLAG | PCR INTERVAL | PCR X MCR PRODUCT INITIAL VALUE | PCR FLAG |
|---|---|---|---|---|
| #1 | 1 | 5 | 50 | 0 |
| #2 | 1 | 2 | 12 | 1 |
| #3 | 0 | 6 | 84 | 1 |
| ------ | ------ | ------ | ------ | ------ |
| #N | 1 | 4 | 60 | 1 |

5

| PCR COUNTER |
|---|
| 3 |
| 0 |
| 0 |
| ------ |
| 2 |

60(6)

| PCR X MCR PRODUCT COUNTER |
|---|
| 30 |
| 12 |
| 84 |
| ------ |
| 40 |

FIG. 14

VC INFORMATION MEMORY 41(4)

| VC NUMBER | BUFFER FLAG | PCR INTERVAL | MCR COUNTER INITIAL VALUE | NUMBER-OF-TIMES COUNTER |
|---|---|---|---|---|
| #1 | 1 | 5 | 10 | 0 |
| #2 | 1 | 2 | 6 | 3 |
| #3 | 0 | 6 | 14 | 1 |
| ...... | ...... | ...... | ...... | ...... |
| #N | 1 | 4 | 15 | 2 |

PCR COUNTER 5

| PCR COUNTER |
|---|
| 3 |
| 0 |
| 0 |
| ...... |
| 2 |

MCR COUNTER 6

| MCR COUNTER |
|---|
| 6 |
| 0 |
| 14 |
| ...... |
| 10 |

FIG. 16

VC INFORMATION MEMORY 42(4)

| VC NUMBER | BUFFER FLAG | PCR INTERVAL | MCR COUNTER INITIAL VALUE | PCR FLAG | FIRST-READ SLOT |
|---|---|---|---|---|---|
| #1 | 1 | 5 | 10 | 0 | 0 |
| #2 | 1 | 2 | 6 | 1 | 3 |
| #3 | 0 | 6 | 14 | 1 | 0 |
| ...... | ...... | ...... | ...... | ...... | ...... |
| #N | 1 | 4 | 15 | 1 | 0 |

5 — PCR COUNTER

| PCR COUNTER |
|---|
| 3 |
| 0 |
| 0 |
| ...... |
| 2 |

6 — MCR COUNTER

| MCR COUNTER |
|---|
| 6 |
| 0 |
| 14 |
| ...... |
| 10 |

FIG. 17

VC INFORMATION MEMORY

| VC NUMBER | BUFFER FLAG | PCR INTERVAL | MCR COUNTER INITIAL VALUE | PCR FLAG |
|---|---|---|---|---|
| #1 | 1 | 4 | 3 | 1 |
| #2 | 1 | 2 | 5 | 1 |
| #3 | 0 | 6 | 2 | 1 |
| #4 | 1 | 5 | 3 | 0 |
| #5 | 1 | 3 | 3 | 1 |

| PCR COUNTER |
|---|
| 0 |
| 0 |
| 0 |
| 2 |
| 0 |

| MCR COUNTER |
|---|
| 2 |
| 3 |
| 2 |
| 1 |
| 3 |

FIG. 20

VC INFORMATION MEMORY (4)

| VC NUMBER | BUFFER FLAG | PCR INTERVAL | MCR COUNTER INITIAL VALUE | PCR FLAG |
|---|---|---|---|---|
| #1 | 1 | 4 | 3 | 1 |
| #2 | 1 | 2 | 5 | 0 |
| #3 | 0 | 6 | 2 | 1 |
| #4 | 1 | 5 | 3 | 1 |
| #5 | 1 | 3 | 3 | 0 |

PCR COUNTER (5)

| PCR COUNTER |
|---|
| 0 |
| 1 |
| 0 |
| 2 |
| 1 |

MCR COUNTER (6)

| MCR COUNTER |
|---|
| 0 |
| 1 |
| 2 |
| 0 |
| 0 |

VC INFORMATION MEMORY

| VC NUMBER | BUFFER FLAG | PCR INTERVAL | MCR COUNTER INITIAL VALUE | PCR FLAG | FIRST-READ SLOT |
|---|---|---|---|---|---|
| #1 | 1 | 2 | 2 | 0 | 0 |
| #2 | 1 | 12 | 2 | 0 | 0 |
| #3 | 1 | 12 | 2 | 0 | 0 |
| #4 | 1 | 12 | 2 | 0 | 0 |
| #5 | 1 | 12 | 2 | 0 | 0 |

5

| PCR COUNTER |
|---|
| 1 |
| 8 |
| 9 |
| 10 |
| 11 |

6

| MCR COUNTER |
|---|
| 1 |
| 1 |
| 1 |
| 1 |
| 1 |

PACKET SWITCH FOR PROVIDING A MINIMUM CELL RATE GUARANTEE

BACKGROUND OF THE INVENTION

The present invention relates generally to packet switch for forwarding (inclusive of switching, transmitting and transferring unless specified otherwise) a fixed length packet, which is applied to a broadband switch, a cross-connect switch and a router, and more particularly to a packet switch taking a packet reading (or outputting) control method (algorithm) of dynamically determining a connection.

In an ATM (Asynchronous Transfer Mode) switch or an ATM transmission device for forwarding a fixed-length packet known as a cell, on the occasion of actualizing a GFR (Guaranteed Frame Rate) function defined as a minimum cell rate (MCR) guarantee function, a conventional scheduling method for guaranteeing a minimum cell rate may be exemplified by a cell reading (or outputting) control method such as a WRR (Weighted Round Robin) method and a WFQ (Weighted Fair Queue) method.

For example, according to an article (SSE98-192: ["Development of GFR Processing Circuit Having Band Sharing Effect"] (Document 1)) by Switching System Workshop in The Japanese Electronic Information Communications Association, the minimum cell rate (MCR) is guaranteed by adopting the WRR method considering whether or not there exists a cell in queue according to a virtual channel VC.

According to this type of WRR-based cell reading method, the minimum cell rate of each VC is reflected in a weight ratio, whereby the minimum cell rate can be guaranteed and further an extra band can be allocated based on the weight ratio.

Further, according to [Round Robin Control System and Method] (Document 2) disclosed in Japanese Patent Application Laying-Open Publication No.11-239151], there is proposed a scheduling method for guaranteeing the minimum cell rate and trying a restriction based on a peak cell rate (PCR) by providing a memory stored with a minimum band cell count of the cells that should be read out (or output) for a unit time with respect to each VC and a (peak cell rate-minimum cell rate) cell count.

Moreover, according to [Band Shared Circuit] (Document 3) disclosed in Japanese Patent Application Laying-Open Publication No.11-191780, what is proposed therein is a method of guaranteeing the minimum cell rate and actualizing a strict PCR interval restriction by adding a restriction function of restricting, after reading the cell per connection (corresponding to VC), the read-out of a next cell of the relevant connection till a time given by [1/PCR] corresponding to an inverse number of PCR in linkage with the above cell read-out.

In the examples of the prior arts described above, according to the WRR-based reading method disclosed in the document 1, a table (or counter) weighted based on MCR per VC is set beforehand, and the cell is read out in accordance with this table. In this method, however, only the MCR-based band allocation can be executed, and hence, if schemed to accommodate the VC in which a ratio of MCR to PCR differs on a band shared unit, the efficiency decreases remarkably, or the PCR restriction can not be kept.

A more specific explanation will be given with the assumption that, for example, as shown in FIG. 1(A), two active VCs (VC#1, VC#2) exist. Note that the active VC is a VC where the cell exists in a corresponding queue (buffer memory).

In this VC set example, in a case (1) where the cell rate does not absolutely exceed PCR, PCR of VC#2 is restricted by 4 Mbps (b/s), and consequently PCR of VC#1 becomes 2 Mbps, with the result that the corresponding cell can be read only when less than original PCR (5 Mbps). Further, in a case (2) where the cell of VC#1 is read at PCR, PCR of VC#1 is 5 Mbps, which means that VC#2 exhibiting doubled MCR shows PCR of 10 Mbps well over PCR of VC#2.

Thus, there arises a problem that the PCR restriction and the read-out with the high efficiency are incompatible with each other under on the WRR read-out control.

What can be considered to obviate this problem is an architecture of an ATM switch ATM-SW, wherein a PCR shaper (peak cell rate restriction unit) SHP is, as shown in FIG. 2, provided at a rear stage of a WRR (Weighted Round Robin) (MCR guaranty) read-out control unit CNT. With this architecture, it is feasible to read out the cell at the high efficiency as in the case (2), and besides the PCR restriction can be attained by the PCR shaper.

According to this method for solution, however, the PCR shaper also requires an individual VC buffer BUF, and it is therefore inevitable that a hardware quantity increases to a large extent. Further, the cell rate restriction area is segmented into two sub-areas, resulting in a decline of efficiency.

Hence, a method of integrating and executing the MCR guaranty read-out and the PCR restriction in one area is effective in terms of reducing the hardware quantity and integrating the cell rate restriction sub-areas.

The ATM switch ATM-SW disclosed in the document 2 described above takes a scheduling method of trying the MCR guaranty and the PCR restriction by use of a counter memory in the same area (see FIG. 3).

This method, however, has an error of timing for initializing the counter, and it can be therefore presumed that this method is incapable of actualizing even the guaranty of the minimum cell rate, much less the PCR restriction. Supposing that an optimum initialization timing is taken, this method is simple enough to restrict a cell count of the cells read out for a predetermined unit time, and hence it is inevitable that there occurs a traffic burst corresponding to processing of a counter thereof (see FIG. 4(A)).

What can be considered as a method of obviating this traffic burst is that a read-out interval restriction counter is, as disclosed in the document 3 given above, provided for every VC, and a read-out cell interval is restricted in each VC so that a read-out rate is PCR or under (see FIG. 4(B)). Target items such as the reduction in the hardware quantity, the MCR guaranty, the impartial band allocation based on MCR and the strict PCR restriction can be actualized by adopting the system architecture disclosed in the document 3.

The method in the document 3 does not, however, account for priority control when a cell read-out conflict occurs at the same slot, and is therefore incapable of reading out the cells at a high efficiency, resulting in a decrease in throughput. Namely, there might occur a conflict controllable so that the cells of a plurality of VCs can be read out at a certain slot because of handling VCs having arbitrary MCR and PCR (see FIG. 5).

In such a case, the number of cells readable at one slot is "1," and hence the scheduling control for selecting one of the plurality of VCs is needed. If this selection is executed based on Round Robin and on a static reading algorithm involving a selection of a VC having a larger MCR, he throughput might decline due to the selection in an improper reading sequence.

For example, as shown in FIG. 1(B), it is assumed that there are five active VCs (VC#1 , . . . , VC#5). MCR of VC#1 is 4 Mbps, and each of MCRs of other virtual channels VC#2~VC#5 is 1 Mbps. Further, PCR of each VC is 10 Mbps for a total cell rate 20 Mbps, and each VC therefore requires a 2-slot PCR interval (slot interval) as a PCR restriction.

Under this condition, if trying to actualize impartial MCR read-out, there may be provided a mechanism for providing an MCR counter of which a value is proportional the MCR value, decrementing the counter value by [1] each time the cell is read out, and getting the relevant VC ruled out of the read-out target when the counter value comes to [0]. Further, when the value of each of the MCR counters of all the active VCs becomes [0], the MCR counter is reset.

In this example, when the read-out control based on Round Robin is carried out, as shown in FIG. 6, the read-out conflict between VC#1 and VC#3 occurs at the third slot from the start. During this conflict, the process is based on Round Robin in this example, and therefore the read-out priority is given not to VC#1 of which the cell has already been read out once but to VC#3 with the cell that is not yet read out. Similarly, in the case of the cell read-out conflict between VC#1 and VC#5, the cell of VC#1 is read out later on, and hence eventually the second cell of VC#1 is read out at the sixth slot to which Round Robin makes one cycle.

Moreover, at this point of time, the value of each of the MCR counters of VC#2~VC#5 becomes [0], so that the cell readable VC is only VC#1. Hence, the cell of the VC#1 is read out at the sixth slot onwards. The PCR interval of VC#1 is, however, [2], and therefore the cells can not be read out consecutively. This leads to an occurrence of free slot, and a decline of throughput is therefore inevitable.

Further, supposing that a next read-out timing is set earlier corresponding to such a degree that the cell read-out of VC#1 is shifted backward (forwards the future in time) to a slot, a read-out time series becomes as shown in FIG. 7, whereby the free slot disappears with an enhanced throughput. While on the other hand, however, there might be a possibility in which the traffic burst remarkably increases, and this causes the same problem as in the method in the document 2.

On the other hand, if the cell read-out is executed not by Round Robin but by the algorithm for giving the priority to VC having a larger MCR as VC#1 has, the read-out time series becomes as shown in FIG. 8 in the case of the example shown in FIG. 1(B), wherein the conditions of the PCR restriction, CDV (Cell Delay Variation) and the throughput can be all satisfied. In an example as shown in FIG. 1(C), however, the read-out time series becomes as shown in FIG. 9, and it follows that the throughput declines.

Thus, the read-out control adopting the static reading algorithm has a problem that a pattern with declined performance invariably exists in a environment where there can be schemed an infinite number of VC accommodation patterns with PCR and MCR that differ per VC. Now, the reason why this sort of problem arises will be examined.

To start with, an emphasis is put on the examples shown in FIGS. 6 and 9 where the free slot occurs. A point common to these examples is that when the conflict occurs, the cell read-outs of the VCs where there are larger number of cells that should be read out at one cycle, i.e., the MCR counters have larger remaining values, are to be executed later on. Hence, there are eventually left only the VCs in which the MCR counters have the larger values, with the result that the free slots occurs due to the PCR restrictions of the VCs.

Namely, it may be considered that what is required is not the static cell reading algorithm but a cell reading algorithm for dynamically determining a cell read-out VC with reference to the present value of the MCR counter that is decremented each time the cell is read out. A problem still exists in the way of simply selecting the virtual channel VC having a larger MCR counter value.

For instance, as shown in FIG. 1(D), an example where the two active VCs exist is put into contemplation. When giving the priority to the VC having the larger MCR counter value, the read-out cell time series becomes as shown in FIG. 10. To be more specific, the cells of VC#1 having the larger MCR counter value are consecutively read out from the start up to the eighth slot, and at the ninth slot a first cell of VC#2 is read out. Until the cells for the MCR counter value of VC#2 are read out after the cells of VC#1 have been read out at the tenth and eleventh slots, however, it can be understood that the free slots occur, and the throughput declines.

SUMMARY OF THE INVENTION

Accordingly, it is a primary object of the present invention to provide a packet switch capable of executing a minimum cell rate guaranty and a peak cell rate restriction impartially at a high efficiency with respect to a connection having an arbitrary minimum cell rate and peak cell rate.

To accomplish the above object, a first packet switch according to the present invention comprises a memory unit for storing a flag for indicating a state of existence of a packet in a buffer memory, a peak cell rate packet interval value for restricting a read-out rate to a peak cell rate or under, and a minimum cell rate counter initial value expressed as a minimum cell rate in a way of making these parameters corresponding to every connection, a peak cell rate counter unit decremented by a predetermined value at every packet read-out timing with the peak cell rate packet interval value serving as an initial value, a minimum cell rate counter unit for retaining a value of a corresponding connection, which is decremented by a predetermined value each time the packet is readout of the buffer memory, and a read-out control unit for detecting based on the flag that the packet exists in the buffer memory when the packet read-out timing is reached, and setting as a read-out target the packet corresponding to a connection exhibiting a maximum value of product of the maximum cell rate packet interval value and a value retained in the minimum cell rate counter unit at that timing from at least one or more connections receiving no peak cell rate restriction, which is detected based on the maximum cell rate packet interval value.

A second packet switch according to the present invention comprises a memory unit for storing a flag for indicating a state of existence of a packet in a buffer memory, a peak cell rate packet interval value for restricting a read-out rate to a peak cell rate or under, and a minimum cell rate counter initial value expressed as a minimum cell rate in away of making these parameters corresponding to every connection, a peak cell rate counter unit decremented by a predetermined value at every packet read-out timing with the peak cell rate packet interval value serving as an initial value, a minimum cell rate counter unit for retaining a value of a corresponding connection, which is decremented by a predetermined value each time the packet is read out of the buffer memory, and a read-out control unit for detecting based on the flag that the packet exists in the buffer memory when the packet read-out timing is reached, and setting as a read-out target the packet corresponding to a connection exhibiting a maximum value of product of the maximum cell rate packet interval value and a value obtained by decrementing a value retained in the minimum cell rate counter unit by 1 at that timing from at least one or more connections receiving no peak cell rate restriction, which is detected based on the maximum cell rate packet interval value.

A third packet switch according to the present invention comprises a memory unit for storing a flag for indicating a state of existence of a packet in a buffer memory, a peak cell rate packet interval value for restricting a read-out rate to a peak cell rate or under, and a product initial value of a product of the peak cell rate packet interval value and a minimum cell rate counter initial value expressed as a minimum cell rate in a way of making these parameters corresponding to every connection, a peak cell rate counter unit decremented by a predetermined value at every packet read-out timing with the peak cell rate packet interval value serving as an initial value, a product decrement counter unit for retaining a value of a corresponding connection, which is decremented by the peak cell rate packet interval value each time the packet is read out of the buffer memory, with the product initial value serving as an initial value, and a read-out control unit for detecting based on the flag that the packet exists in the buffer memory when the packet read-out timing is reached, and setting as a read-out target the packet corresponding to a connection exhibiting a maximum value of the value retained in the product decrement counter unit from at least one or more connections receiving no peak cell rate restriction, which is detected based on the maximum cell rate packet interval value.

According to a fourth packet switch of the present invention, in the first, second or third packet switch, the read-out control unit may set a packet read-out timing as an initialization timing of the peak cell rate counter unit corresponding to the read-out connection.

According to a fifth packet switch of the present invention, in the first, second or third packet switch, the read-out control unit may set a point of time when the peak cell rate counter unit comes to its expiration as an initialization timing of the peak cell rate counter unit.

A sixth packet switch of the present invention, in the first, second or third packet switch, may further comprise a counter unit incremented by a predetermined value each time the peak cell rate counter unit comes its expiration and decremented by the predetermined value each time a packet of a corresponding connection is read out, for setting a predetermined peak cell rate restriction value as an upper limit value, wherein the read-out control unit may permit the read-out of the packet if a value retained by the counter unit is equal to or larger than a predetermined value.

According to a seventh packet switch of the present invention, in the first or second packet switch, the read-out control unit may include a search unit for detecting a connection exhibiting a maximum value by comparing a product of the peak cell rate packet interval value and the value retained by the minimum cell rate counter unit at that timing in sequence with respect to all connections with the packet existing in the buffer memory and receiving no peak cell rate restriction.

An eighth packet switch of the present invention, in the first or second packet witch, may further comprise a memory unit for storing in a binary number a product of the peak cell rate packet interval value and the value retained in the minimum cell rate counter unit per connection, wherein the read-out control unit may include a search unit for detecting a connection exhibiting a maximum value by executing, in sequence from a most significant bit down to a least significant bit, an operation of simultaneously searching a bit ON-state and a bit OFF-state of the same digit with respect to all the connections that have the packets in the buffer memories and are not subjected to the peak cell rate restriction.

According to a ninth packet switch of the present invention, in the first or second packet switch, the read-out control unit, if there exists no connection satisfying two conditions that the packet exists in the buffer memory and that the value retained in the minimum cell rate counter unit is equal to or larger than a predetermined value, may initialize the minimum cell rate counter units corresponding to all the connections.

According to a tenth packet switch of the present invention, the read-out control unit, if there exists no connection satisfying three conditions that the packet exists in the buffer memory, that the value retained in the minimum cell rate counter unit is equal to or larger than a predetermined value and that the connection does not receive the peak cell rate restriction, may initialize the minimum cell rate counter units corresponding to all the connections.

According to an eleventh packet switch of the present invention, the read-out control unit, after initializing the minimum cell rate counter unit, if there exists no connection in which the packet can be read out, may further select one of the connections with the packets existing in the buffer memories and kept in the peak cell rate restriction, and makes the packets readable by canceling the peak cell rate restriction.

According to a twelfth packet switch of the present invention, the read-out control unit, if a read-out conflict between the connection kept in the peak cell rate restriction and the connection with the packet read first by canceling the peak cell rate restriction occurs at the same timing, may give a read-out priority to the packet corresponding to the connection kept in the peak cell rate restriction.

According to a thirteenth packet switch of the present invention, the read-out control unit, if the read-out conflict between the connections with the packets read first by canceling the peak cell rate restriction occurs at the same timing, may give the read-out priority to the packet corresponding to the connection having a larger peak cell rate packet interval value.

A fourteenth packet switch according to the present invention comprises a memory unit for storing a flag for indicating a state of existence of a packet in a buffer memory, a peak cell rate packet interval value for restricting a read-out rate to a peak cell rate or under, and a WWR counter initial value obtained by weighting the minimum cell rate in a way of making these parameters corresponding to every connection, a peak cell rate counter unit decremented by a predetermined value at every packet read-out timing with the peak cell rate packet interval value serving as an initial value, a WWR counter unit for retaining a value of a corresponding connection, which is decremented by a predetermined value each time the packet is read out of the buffer memory, and a read-out control unit for detecting based on the flag that the packet exists in the buffer memory when the packet read-out timing is reached, and setting as a read-out target the packet corresponding to a connection exhibiting a maximum value of product of the peak cell rate packet interval value and the value retained in the WRR counter unit at that timing from at least one or more connections receiving no peak cell rate restriction, which is detected based on the maximum cell rate packet interval value.

A fifteenth packet switch according to the present invention comprises a memory unit for storing a flag for indicating a state of existence of a packet in a buffer memory, a peak cell rate packet interval value for restricting a read-out rate to a peak cell rate or under, and a WWR counter initial value obtained by weighting the minimum cell rate in a way of making these parameters corresponding to every connection, a peak cell rate counter unit decremented by a predetermined value at every packet read-out timing with the peak cell rate packet interval value serving as an initial value, a WWR counter unit for retaining a value of a corresponding connection, which is decremented by a predetermined value each time the packet is read out of the buffer memory, and a read-out control unit for detecting based on the flag that the packet exists in the buffer memory when the packet read-out timing is reached, and setting as a read-out target the packet corresponding to a connection exhibiting a maximum value of product of the peak cell rate packet interval value and a value obtained by decrementing the value retained in the WRR counter unit at that timing by 1 from at least one or more connections receiving no peak cell rate restriction, which is detected based on the maximum cell rate packet interval value.

According to the present invention, it is feasible to execute the minimum cell rate guaranty and the peak cell rate restriction impartially at the high efficiency with respect to the connection having the arbitrary minimum cell rate and peak cell rate by taking the packet read-out control method for dynamically determining the cell read-out connection.

BRIEF DESCRIPTION OF THE DRAWINGS

These objects and advantages of the present invention will become more apparent and more readily appreciated from the following detailed description of the presently preferred exemplary embodiments, taken in conjunction with the accompanying drawings of which:

FIGS. 1A–1D are diagrams showing an example of setting a virtual channel VC in an ATM switch;

FIG. 13 is a table showing an example of structures of the VC information memory stored with product information and of counters;

FIG. 14 is a table showing an example of structure of the MC information memory including a number-of-times counter as a substitute for the PCR flag;

FIG. 16 is a table showing an example of structure of a VC information memory having a first-read slot;

FIG. 17 is a table showing an example of numerical values of the VC information memory and of counters at a certain time;

FIG. 20 is a table showing an example of numerical values of the VC information memory and of counters at a certain time;

FIG. 23 is a table showing an example of numerical values of the VC information memory and of counters at a certain time;

DETAILED DESCRIPTION OF THE PREFERRED EMBODIMENTS

Next, Embodiments of the present invention will hereinafter be described with reference to the accompanying drawings.

[Architecture of Packet Switch (ATM Switch)]

(Basic Architecture)

An ATM switch classified as a packet switch for forwarding a fixed length packet known as a cell in one embodiment of the present invention, involves the use of a cell reading control method (scheduling method) for determining a read-out virtual channel VC in consideration of a PCR (Peak Cell Rate) interval in addition to a value of an MCR (Minimum Cell Rate) counter in order to obviate the above problems inherent in the prior art.

Supposing that the PCR interval (PCR slot interval) of a certain virtual channel VC at a certain time is, for example, m-slots and a value of the MCR counter is n, even when reading out the cells at the PCR interval with respect to this VC, it requires a time equivalent to m×(n−1)+1 slots to read out all the n-pieces of cells. Further, there is needed a time equivalent to m×n slots till a next readable time is reached afresh after all the cells have been read out.

Namely, if the read-out of the cell of VC having a large value of this kind is shifted backwards in the future in time, it follows that a read-out time as a whole shifts backwards, and this results in a decline of throughput as in the example of the prior art described above. Hence, the ATM switch in one embodiment of the present invention selects a virtual channel VC having the maximum number of m×(n−1) or m×n slots, if a cell read conflict occurs.

Figure 2:
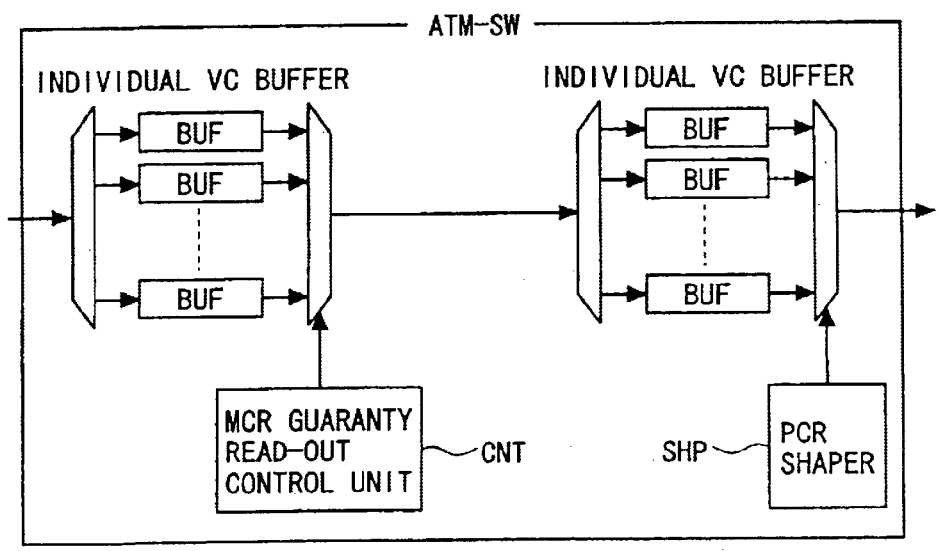
FIG. 2 is a diagram showing an example of architecture of a rear-stage shaper type ATM switch in the prior art.
Figure 3:
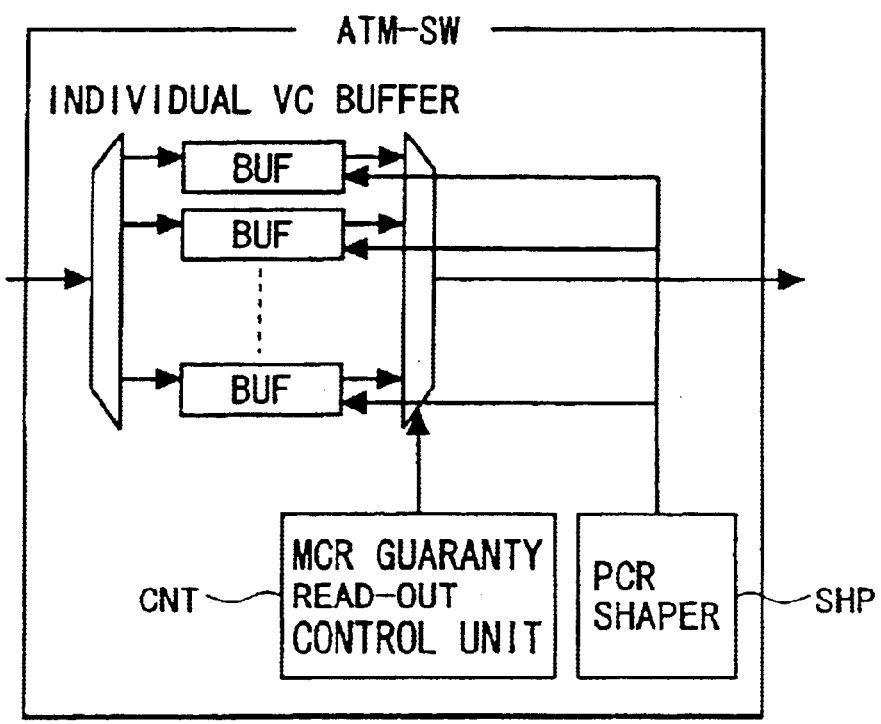
FIG. 3 is a diagram showing an example of architecture of an ATM switch for executing a PCR restriction per VC in the prior art.
Figure 4B:
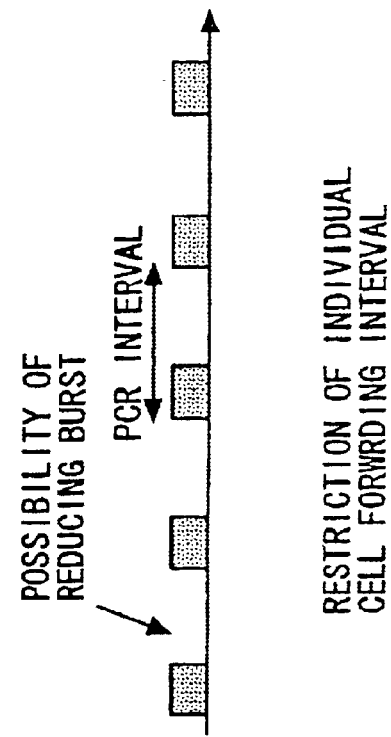
FIGS 4A and 4B are explanatory diagrams showing a PCR restriction method in the prior art.
Figure 4A:
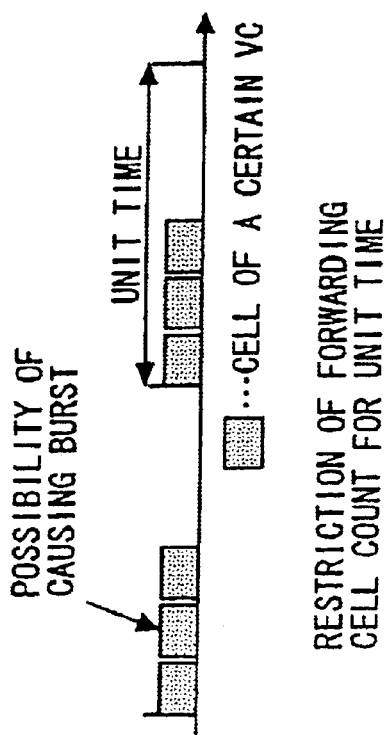
Figure 5:
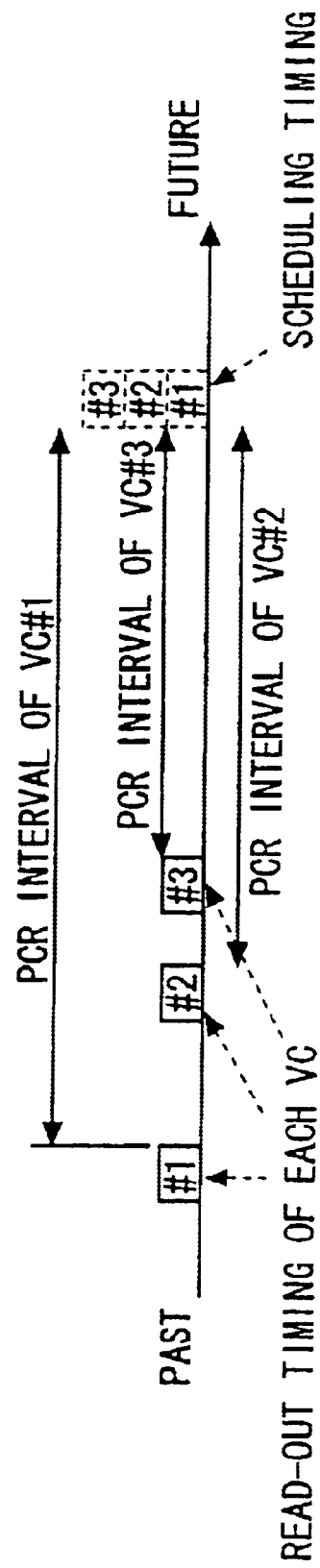
FIG. 5 is an explanatory diagram showing a read-out duplex mode with respect to a plurality of VCs in the prior art.
Figure 6:
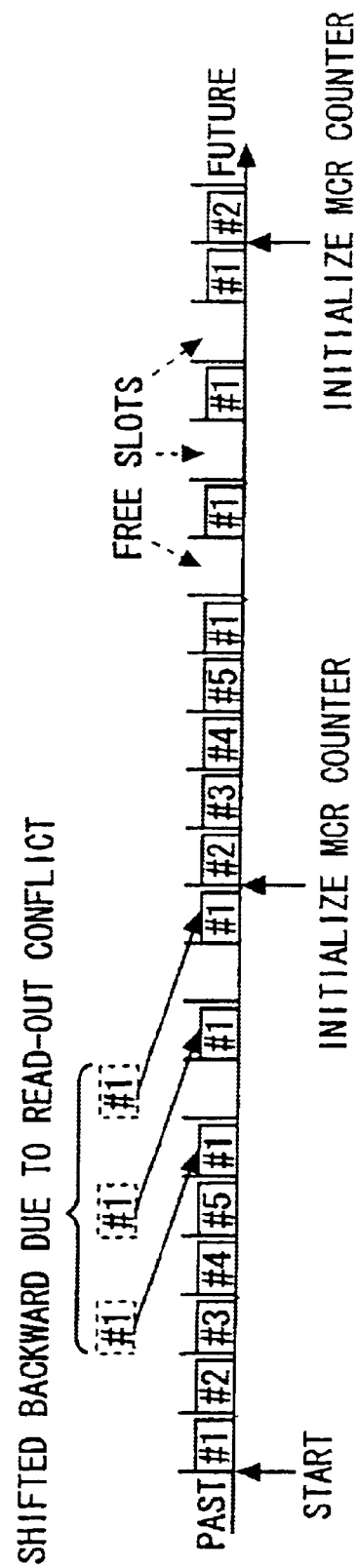
FIG. 6 is a diagram showing a cell time series based on a Round Robin method in the prior art.
Figure 7:
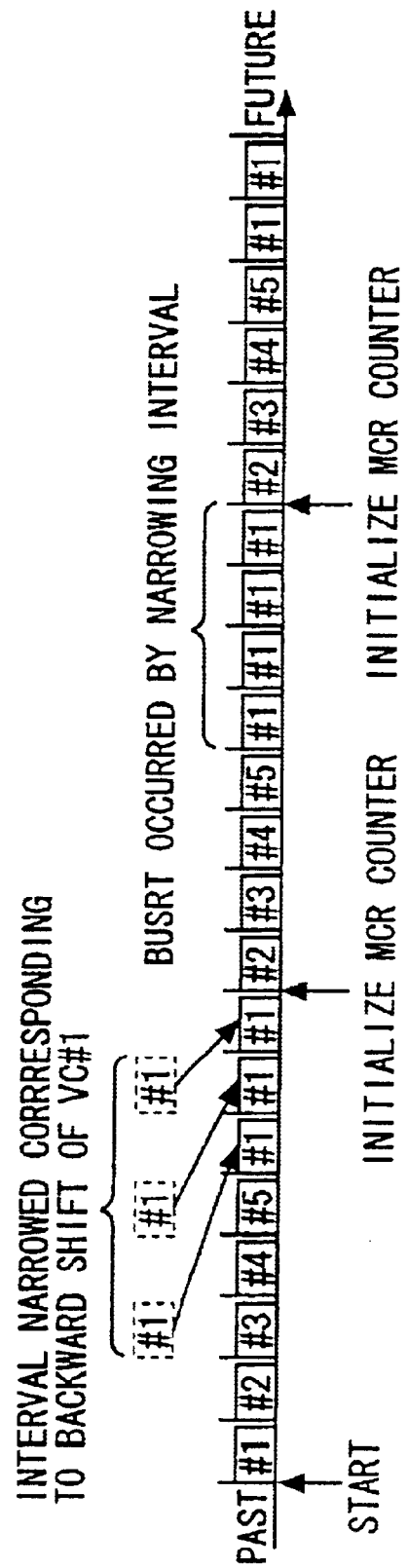
FIG. 7 is a diagram showing a cell read-out time series in the case of allowing CVD (Cell Delay Variation) in the prior art.
Figure 8:
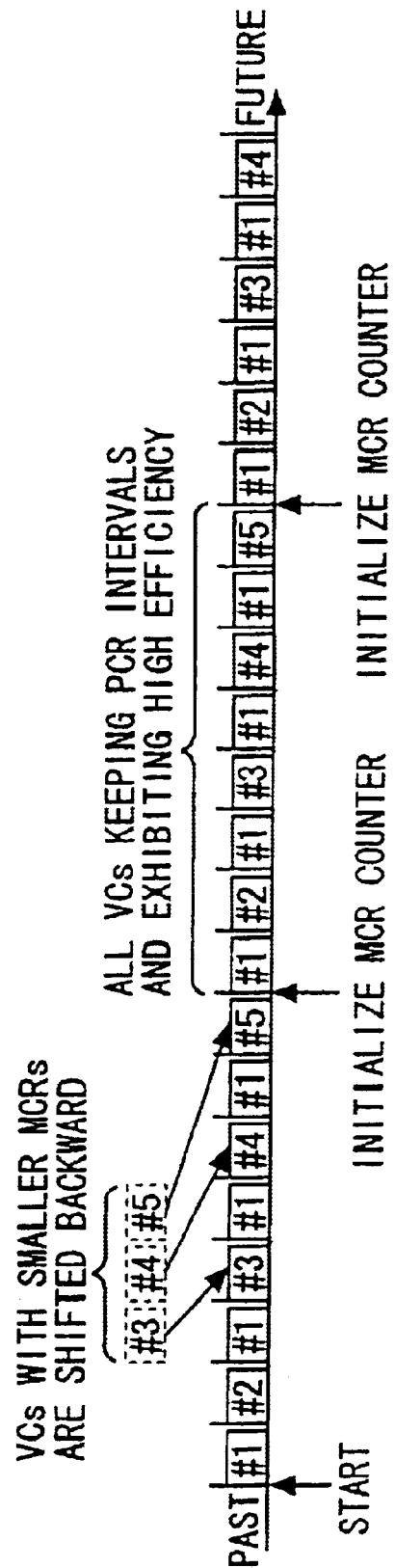
FIG. 8 is a diagram showing the cell read-out time series in the case of giving the priority to VC having a larger MCR value in the prior art.
Figure 9:
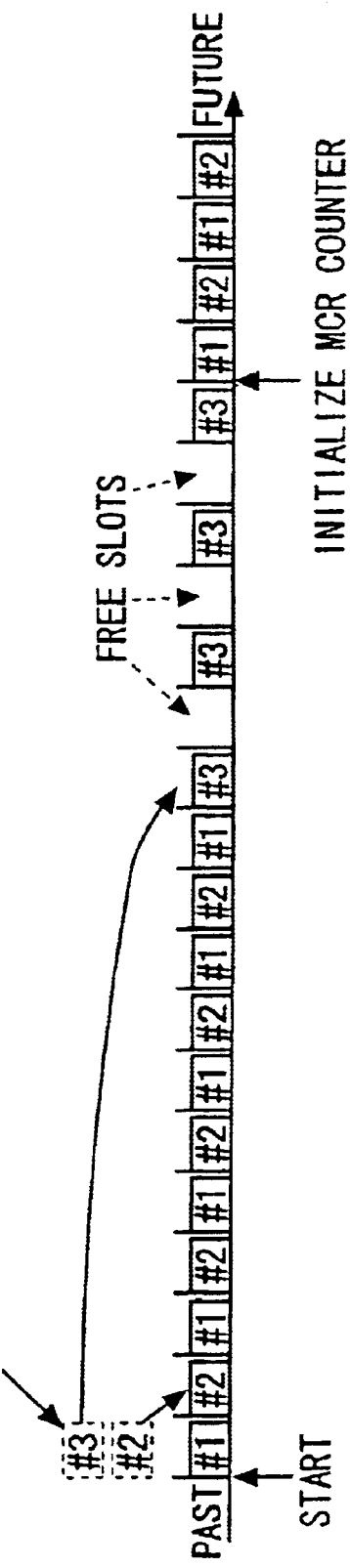
FIG. 9 is a diagram showing the cell read-out time series in the case of giving the priority to VC having the larger MCR value in the prior art.
Figure 10:
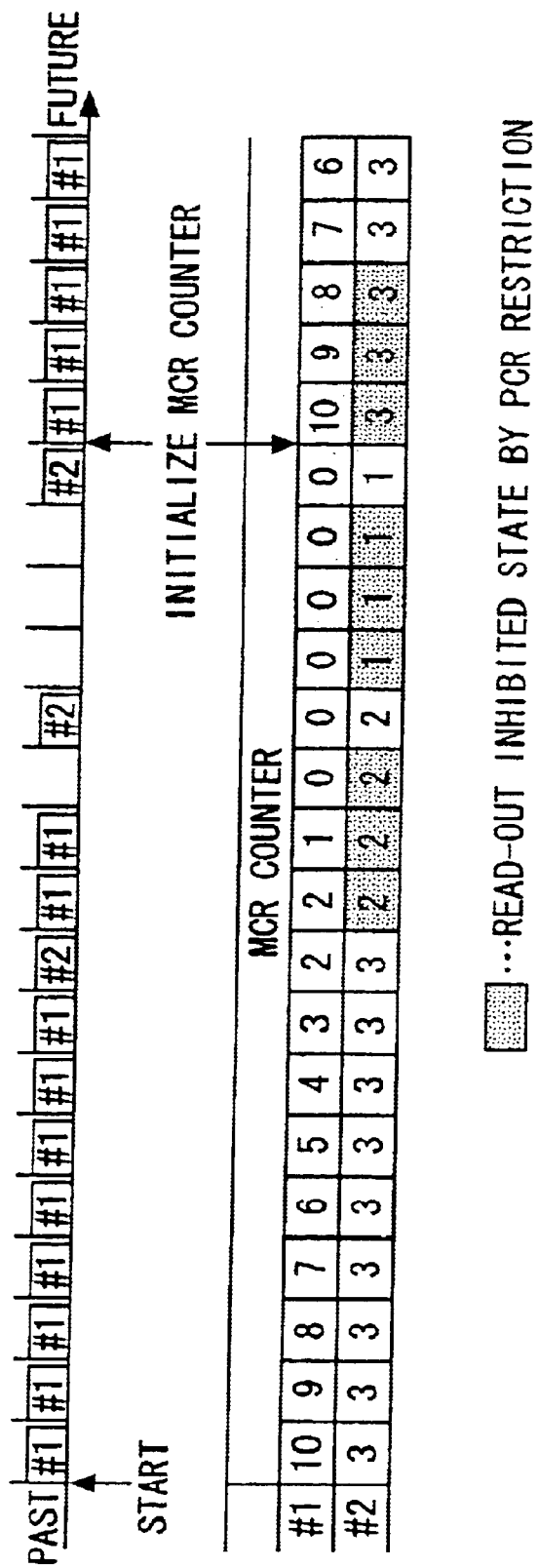
FIG. 10 is a diagram showing the cell read-out time series in the case of giving the priority to VC having a larger MCR value in the prior art.
Figure 11:
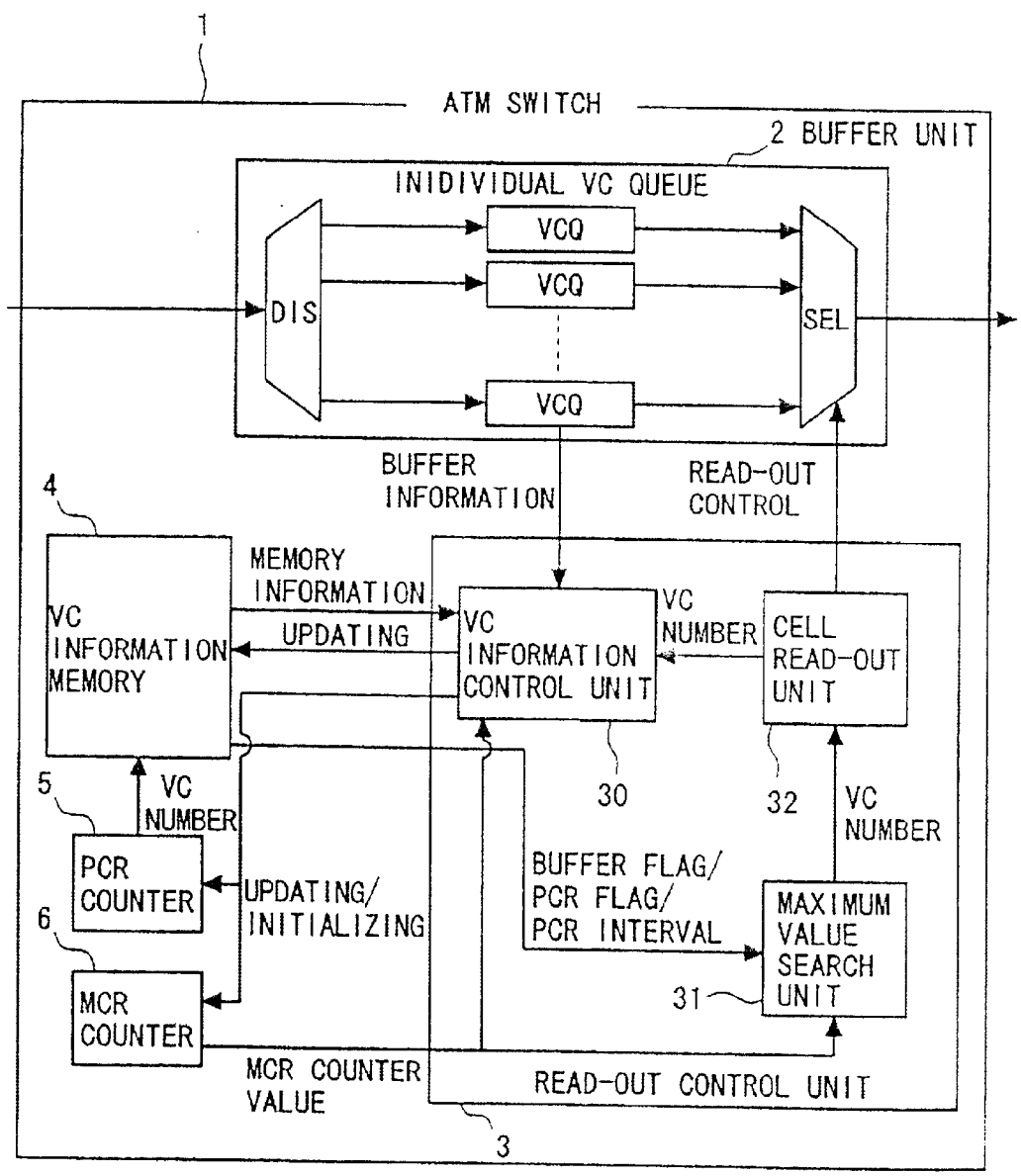
FIG. 11 is a block diagram showing an architecture of an ATM switch in one embodiment of the present invention.

FIG. 11 shows a basic architecture of the ATM switch in one embodiment of the present invention. Referring to FIG. 11, an ATM switch 1 includes a buffer unit 2 having individual VC queues VCQ each constructed of a logic buffer memory corresponding to each virtual channel VC, a distribution unit DIS for distributing the cells to the individual VC queues VCQ, and a selection unit SEL for multiplexing the cells from the individual VC queues VCQ. Depending on a position where the buffer unit 2 is disposed, the ATM switch 1 may take any one of configurations such as a cross-point buffer type, an input buffer type, an output buffer type and a common buffer type.

The ATM switch 1 further includes, as functions for controlling the individual VC queues VCQ, a read-out control unit 3, a VC information memory 4, a PCR counter 5 and an MCR counter 6.

That is, the ATM switch 1 taking the basic architecture described above includes the VC information 4, the PCR (Peak Cell Rate) counter 5 and the MCR (Minimum Cell Rate) counter 6, corresponding to each virtual channel VC. The VC information memory 4 stored with a buffer flag for indicating whether or not the cell exists in the individual VC queue VCQ in the buffer unit 2, a PCR interval as a maximum allowable band cell interval value needed for setting a read-out rate to the peak cell rate or under, and an MCR (Minimum Cell Rate) counter initial value expressed as a minimum cell rate. The PCR counter 5 decrements the PCR interval value as an initial value by a predetermined value [1] per slot. Each time the cell is read out of the individual queue VCQ, the MCR counter 6 decrements a counter value related to concerned VC by [1].

Further, the ATM switch 1 includes a read-out control unit 3 for controlling the read out of the buffer unit 2, wherein when a cell read-out timing is reached, a virtual channel VC exhibiting a maximum product of the PCR interval value and the MCR counter value at that timing among VCs which have the cells in the individual VC queues VCQ of the buffer unit 2 and are not restricted in terms of the peak cell rate, is set as a cell read-out target.

The read-out control unit 3 has a VC information control unit 30 for updating and initializing the VC information memory 4, the PCR counter 5 and the MCR counter 6 on the basis of buffer information from the buffer unit 2, VC information (VC numbers) of VCs in which the cells have been read, memory information from the VC information memory 4 and an MCR counter value from the MCR counter 6.

The read-out control unit 3 further has a maximum value searching unit 31 for searching a maximum value based on pieces of information from the VC information memory 4 and the MCR counter 6, i.e., the buffer flag, the PCR flag, the PCR interval and the MCR counter value, and a cell reading unit 32 for executing read control for reading the relevant VC cells from the individual VC queue VCQ of the buffer unit 2 in accordance with the VC number given from the maximum value searching unit 31.

Herein, the read-out control unit 3 may also control the read from the buffer unit 2, wherein when the cell read-out timing is reached, the virtual channel VC exhibiting the maximum product of the PCR interval value and the MCR counter value at that timing among VCs which have the cells in the individual VC queues VCQ of the buffer unit 2 and are not restricted in terms of the peak cell rate, is set as the cell read-out target.

(Detailed Basic Structures of VC Information Memory, PCR Counter and MCR Counter)

Figure 12:
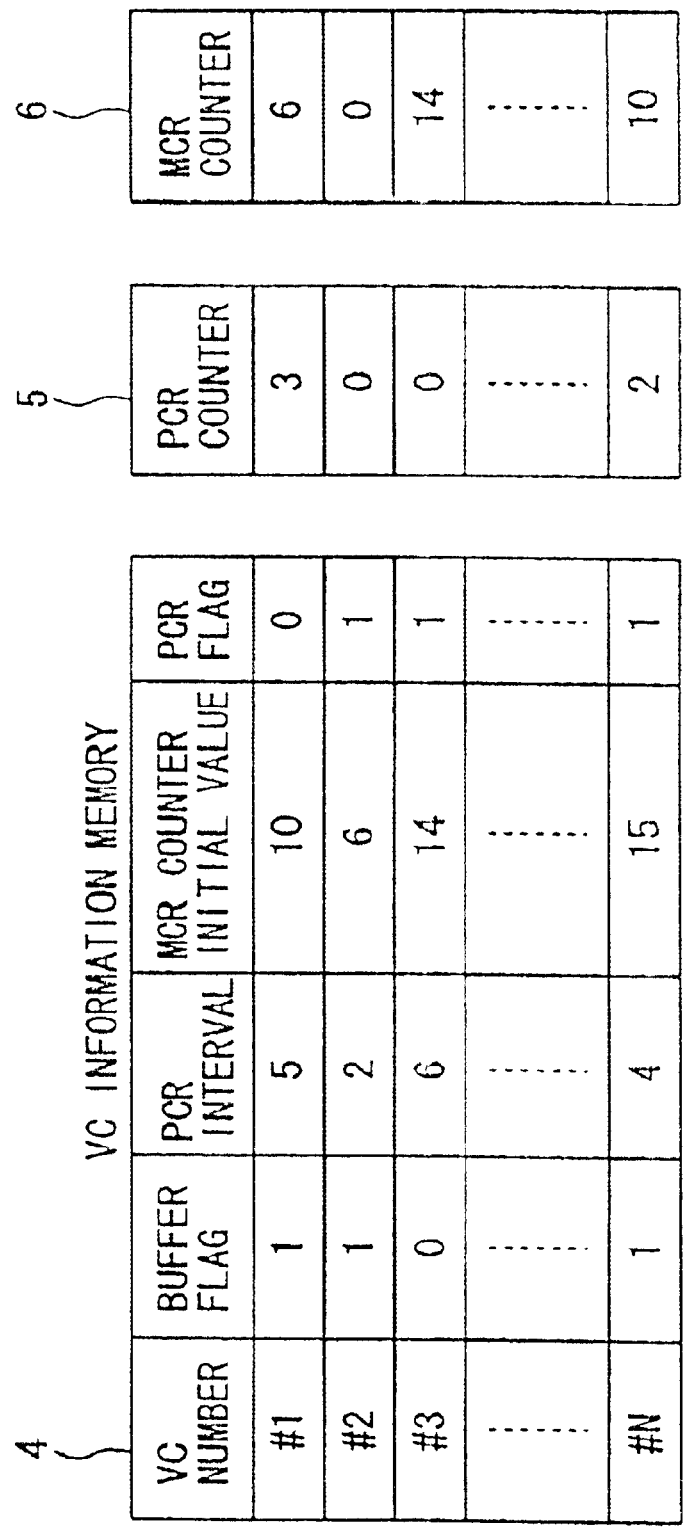
FIG. 12 is a table showing basic structures of a VC information memory, a PCR counter and an MCR counter.

The VC information memory 4 takes an information (data) storage structure as shown in FIG. 12. The VC information memory 4 is stored with the buffer flag for indicating whether or not the cell exists in the individual VC queue VCQ of the buffer unit 2, the PCR interval (value) for setting the read-out rate to the peak cell rate (PCR) or under due to the PCR restriction, the MCR counter initial value expressed as the minimum cell rate (MCR), and the PCR flag, corresponding to each VC number (#1, . . . #N).

Further, the PCR counter 5 for decrementing the PCR interval value as the initial value by [1] per slot with respect to all VCs, and the MCR counter 6 for decrementing the counter value by [1] each time the cell of the corresponding self-VC is read, are provided corresponding to the VC number. Note that the PCR counter 5 and the MCR counter 6 may be configured separately or integrally with the VC information memory 4.

(First Modified Architecture)

The following is a first modified architecture of the basic architecture of the ATM switch 1. As shown in FIG. 13, a VC information memory 40 may substitute for the VC information memory 4 described above. The VC information memory 40 contains a PCR×MCR product initial value field stored with a product of the PCR interval value and the MCR counter initial value in place of the MCR counter initial value field in FIG. 12. A PCR×MCR product counter 60 substitutes for the MCR counter 6. The PCR×MCR product counter 60 makes a decrement by PCR interval value each time the cell of the self-VC is read, wherein the PCR×MCR product initial value is set as an initial value.

(Second Modified Architecture)

In the PCR counter 5 of the ATM switch 1 shown in FIGS. 12, 13 and 14, the cell read-out timing is set as an initialization timing of the PCR counter 5 corresponding to VC concerned. Further, irrespective of whether the cell is read or not, a timing when the PCR counter 5 comes to its expiration, i.e., a timing when the value of the PCR counter 5 becomes [0], may be set as the initialization timing.

(Third Modified Architecture)

As shown in FIG. 14, the VC information memory 4 may be replaced with a VC information memory 41. The VC information memory 41 contains a number-of-times counter field as a substitute for the PCR flag field of the VC information memory 4, wherein an increment of [1] is made each time the PCR counter 5 expires, i.e., each time the counter value becomes [0], a decrement of [1] is made each time the VC cell is read out, and an upper limit value α is set to 3 (in this example)

(Fourth Modified Architecture)

The maximum value search unit 31 of the ATM switch 1 may take the following method. For searching a VC exhibiting a maximum value of m×(n−1) or m×n, products of the PCR intervals and the MCR counter initial values of the MCR counters 6 with respect to two VCs, are compared with each other, the larger product is set as a maximum value, the VC with the larger product is stored as a read-out VC candidate, and this larger product is compared with a new VC product. This operation is executed in sequence with respect to all the VCs that have the cells in the individual VC queues VCQ of the buffer unit 2 and are not subjected to the PCR restriction.

(Fifth Modified Architecture)

Figure 15:
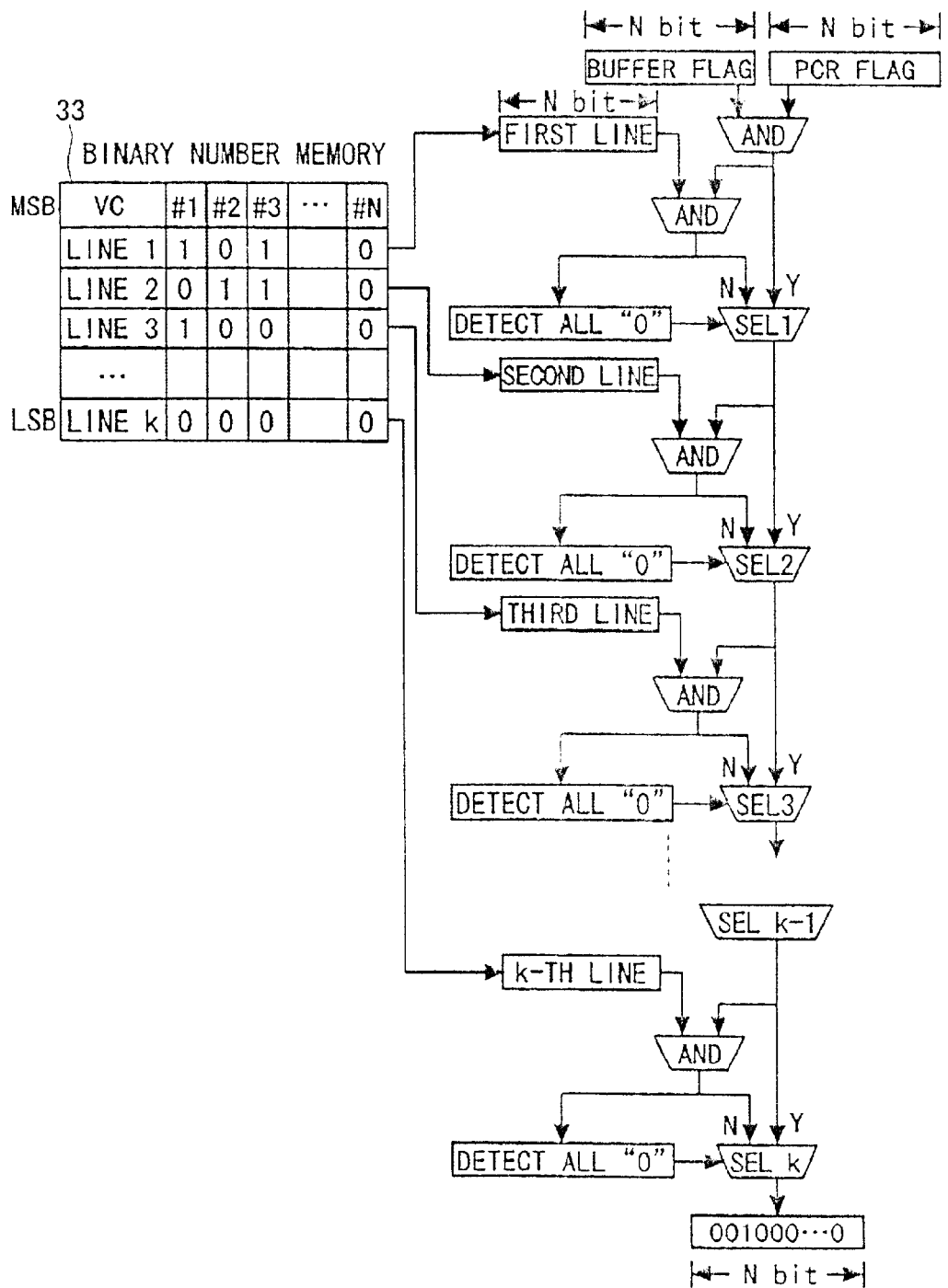
FIG. 15 is an explanatory diagram showing an outline of structure of a maximum value search unit of a read-out control unit.
Figure 18:
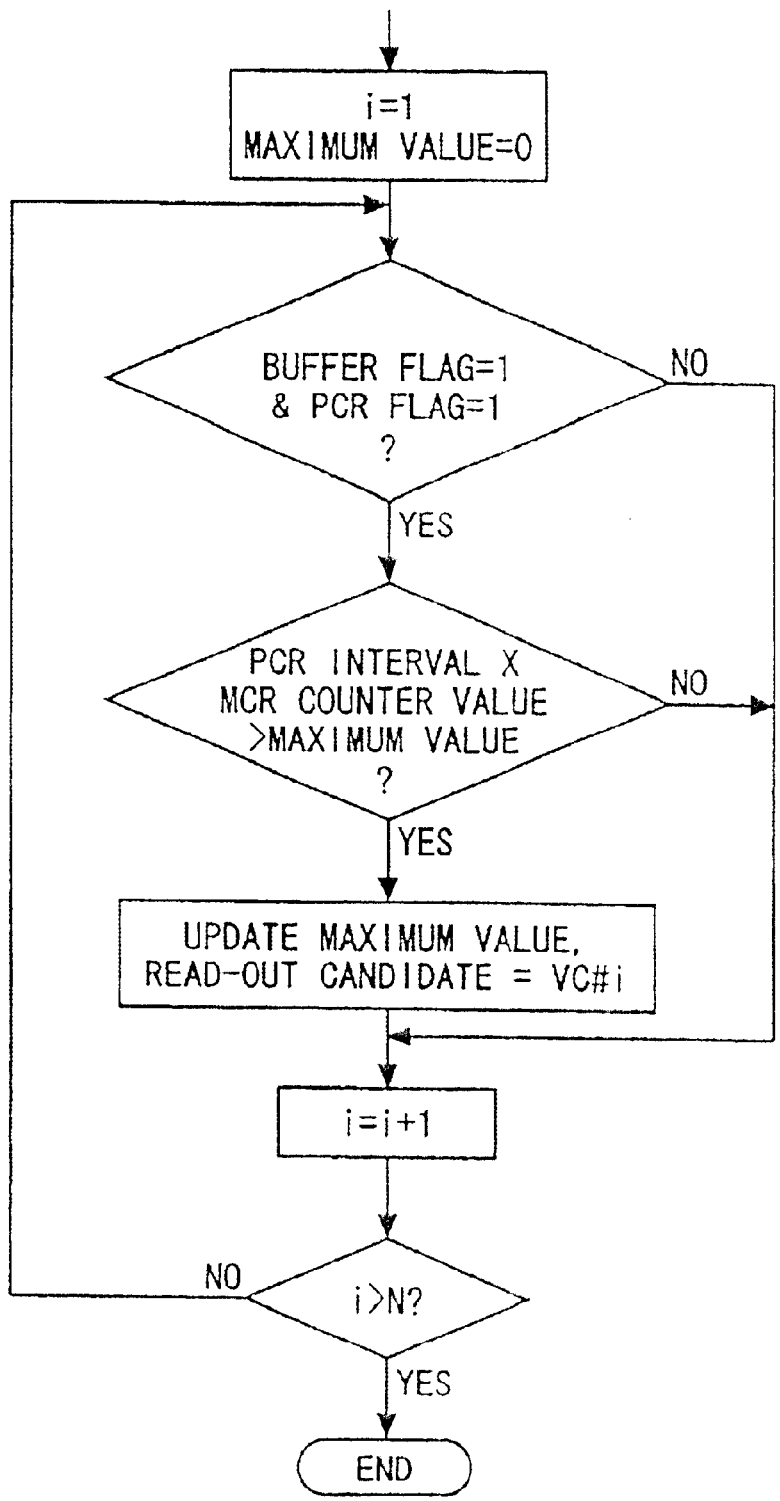
FIG. 18 is a flowchart showing processes in the ATM switch taking a fourth modified architecture.
Figure 19:
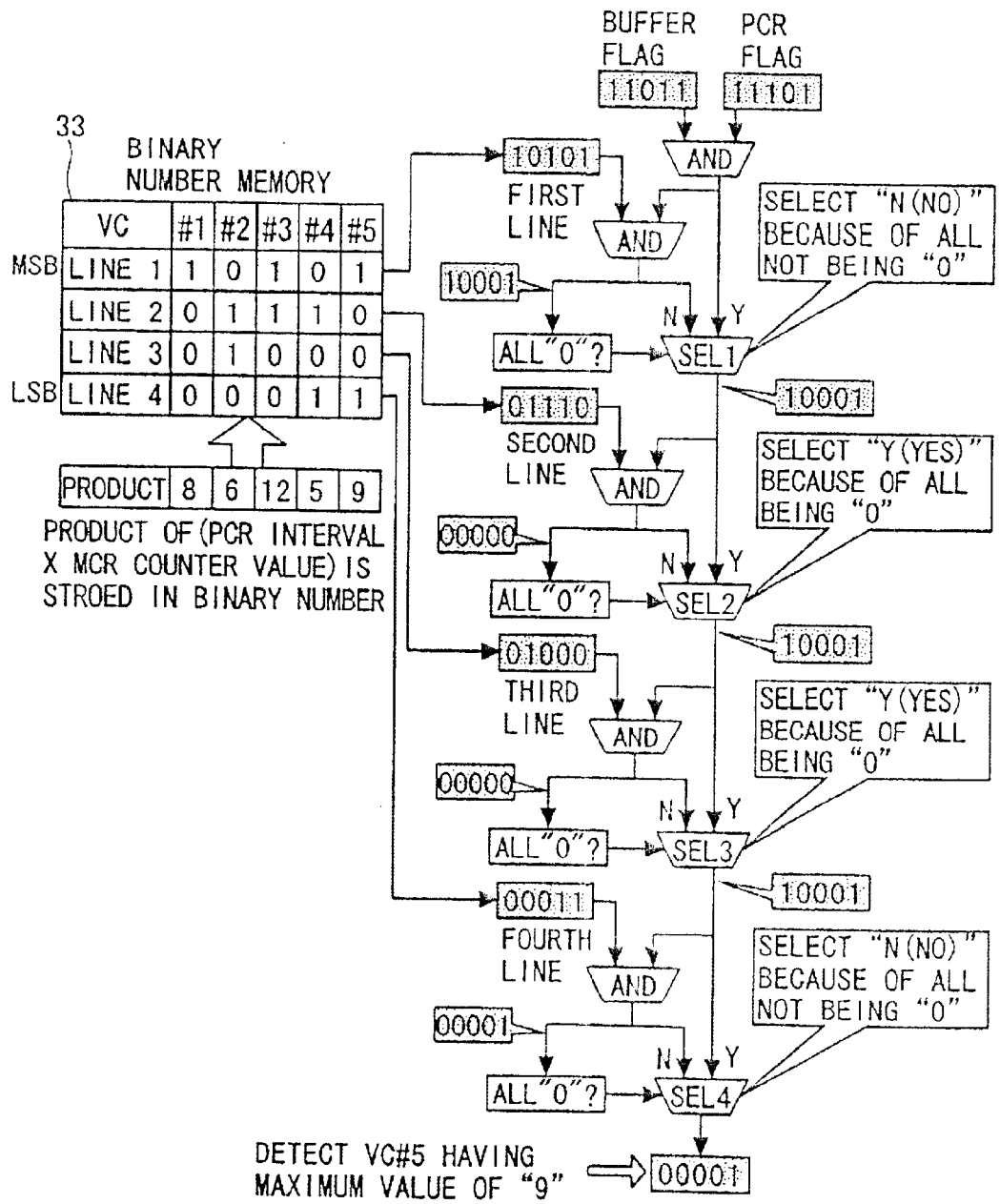
FIG. 19 is an explanatory diagram showing an example of a maximum value searching process in the ATM switch taking a fifth modified architecture.

In the ATM switch 1 described above, as shown in FIG. 15, the maximum value search unit 31 incorporates a binary number memory 33 for storing in binary numbers the product of the PCR interval value and the counter value of the MCR counter 6 per VC. The maximum value search unit 31 is thereby capable of detecting the VC having the maximum value at a high speed by repeating, from a most significant bit MSB down to a least significant bit LSB, an operation of simultaneously searching a bit ON-state ([1]) and a bit OFF-state ([0]) of the same digit with respect to all the VCs that have the cells in the individual VC queues VCQ of the buffer units 2 and are not subjected to the PCR restriction.

(Sixth Modified Architecture)

As for the MCR counter 6 in the ATM switch 1 described above, if there is no VC satisfying two conditions that the cell exists in the individual VC queue VCQ of the buffer unit 2 and that the value of the MCR counter 6 is [1] or larger, the MCR counters 6 corresponding to all the VCs are initialized. Namely, in the case of initializing the MCR counters 6, a timing when all the values of the MCR counters 6 corresponding to the VCs having the cells in the individual VC queues VCQ of the buffer units 2 become [0], may be set as an initialization timing.

(Seventh Modified Architecture)

As for the MCR counter 6 in the ATM switch 1 described above, if there is no VC satisfying three conditions that the cell exists in the individual VC queue VCQ of the buffer unit 2, that the value of the MCR counter 6 is [1] or larger and that a restriction by the PCR counter 5 is not received, the MCR counter 6 is initialized. Namely, there may be adopted an initializing method of initializing the MCR counter 6 if there is no VS with the cells readable to the slot at the present due to the PCR restriction even when there exist the VCs of which the cells corresponding to the value of the MCR counter 6 are not yet read out completely among the VCs having the cells in the individual VC queues VCQ of the buffer units 2.

(Eighth Modified Architecture)

The read-out control unit 3 of the ATM switch 1, if there is no further VC having the readable cells even when initializing the MCR counter 6 as described above, selects one of the VCs having the cells in the individual VC queues VCQ of the buffer units and kept in the PCR restriction, and executes the read-out control algorithm of reading the cell by eliminating the PCR restriction.

This read-out control unit 3, if a cell read-out conflict between the VC kept in the PCR restriction and the VC with the PCR restriction eliminated and with the first-read cell occurs at the same slot, may take the read-out control algorithm of reading preferentially the cell corresponding to the VC kept in the PCR restriction.

Further, the read-out control unit 3, if the cell read-out conflict between a plurality of VCs with the PCR restriction eliminated and with the first-read cells occurs at the same slot, may take the read-out control algorithm of reading preferentially the cell corresponding to the VC having a larger peak cell rate (PCR).

To describe it in much greater details, as shown in FIG. 16, a VC information memory 42 contains a first-read slot field stored with [0] if the VC is kept in the PCR restriction and a slot value read first from an original first-read position if not kept in the PCR restriction. The read-out control unit 3, if there is no further cell readable VC even when initializing the MCR counter 6, performs the read-out control algorithm of selecting one of the VCs having the cells in the individual VC queues VCQ of the buffer units 2, of which the first-read slot value is [0], reading the cell by eliminating the PCR restriction, and describing a slot count shifted forward (towards the past in time) in the first-read slot field.

At this time, the read-out control unit 3, if the cell read conflict between the VC of which the value in the first-read slot field is [0] and the VC of which the value in the first-read slot field exceeds [0] occurs at the same slot, reads preferentially the cell of the VC with the value of [0].

Further, the read-out control unit 3, if the cell read conflict between the plurality of VCs of which the first-read slot field values are each over [0] occurs at the same slot, reads preferentially the cells of the VC exhibiting the larger peak cell rate (PCR).

[Operation of Packet Switch (ATM switch)]

Next, a cell read control (scheduling) method in the ATM switch 1 in one embodiment of the present invention will hereinafter be described with reference to FIGS. 11 through 29.

When the cell arrives at the ATM switch 1, identifiers VPI and VCI contained in the header of the cell are stacked in the corresponding individual VC queue VCQ of the buffer unit 2.

At this time, the VC information control unit 30 of the read-out control unit 3 that receives buffer information on the cell accumulation from the buffer unit 2, when detecting that no cell exists any more in the corresponding individual VC queue VCQ on the basis of the memory information given from the VC information memory 4, updates the buffer flag of the corresponding VC within the VC information memory 4 to [1] from [0]. This buffer flag is, if the cell is read out of the individual VC queue VCQ and the cells stacked disappear, updated to [0] in the same processing step as by the VC information control unit 30.

In the case of the VC information memory structure as shown in FIG. 12 or 13, the PCR flag in the VC information memory 4 (40) is set, i.e., [1] is set in the VCs where the PCR counters 5 corresponding to all the VCs each having the value over [1] are decremented by [1] per slot and comes to [0]. Further, in the case of the VC information memory structure as shown in FIG. 14, the number-of-times counter in the VC information memory 41 is incremented by [1]. At this time, if the second and third modified architectures are taken, the PCR counter 5 is initialized to the PCR interval value at that point of time.

Upon an end of count-down of the PCR counter 5, the processing moves next to a maximum value searching operation. To be specific, in the case of the VC information memory structure in the basic architecture described above, the buffer flag, the PCR flag, the PCR interval value and the MCR counter value are inputted t the maximum value search unit 31 from the VC information memory 4 and the MCR counter 6. Further, in the case of the VC information memory structure in the first modified architecture, the buffer flag, the PCR flag, the PCR interval value and the PCR×MCR product counter value are inputted t the maximum value search unit 31 from the VC information memory 4 (40) and the MCR counter 6.

In he basic architecture described above, the maximum value search unit 31 thereby detects the VC having the maximum value of PCR interval value×MCR counter value, or the VC having the maximum value of PCR interval value×(MCR counter value −1).

An operation of the maximum value search unit 31 will be explained by exemplifying the VC information memory 4, the PCR counter 5 and the MCR counter 6 shown in FIG. 17. The maximum value search unit 31 based on the fourth modified architecture takes processing steps shown in FIG. 18. Namely, the maximum value search unit 31, when detecting the VC having the maximum value, searches it in sequence from VC#1. If being the VC where both of the buffer flag and the PCR flag are set in the VC information memory 4, its value is compared with the maximum value. If larger than the maximum value, this value is updated.

In the VC information memory 4 shown in FIG. 17, both of the buffer flag and the PCR flag are [1] with respect to VC#1, and hence a value given by PCR interval value×MCR counter value (=8) is stored as the maximum value. With respect to VC#2, both of the buffer flag and the PCR flag are [1], however, a value given by PCR interval value×MCR counter value (=6) is smaller than the maximum value in VC#1, and therefore the maximum value is not updated.

Further, with respect to VC#3, the buffer flag is [0], and therefore this virtual channel VC#3 is ruled out of the search target. A virtual channel VC#4 is also ruled out of the search target because of the PCR flag being [0]. With respect to VC#5, both of the buffer flag and the PCR flag are [1], and a value given by PCR interval value×MCR counter value (=9) is larger than the maximum value in VC#1, and hence the maximum value is updated. With this processing step, the maximum value search unit 31 detects VC#5 having the maximum value "9" given by PCR interval value×MCR counter value.

Subsequently, other operation of the maximum value search unit 31 will be explained by exemplifying the VC information memory 4, the PCR counter 5 and the MCR counter 6 shown in FIG. 17. The maximum value search unit 31 based on the fifth modified architecture, based on the PCR interval value and the MCR counter value that are obtained from the VC information memory 4 and the MCR counter 6, stores the binary number memory 33 provided in this maximum value search unit 31 with a product of the PCR interval value and the MCR counter value as a binary number.

In this state, an ANDed result "11001" of a buffer flag value "11011" and a PCR flag value "11101" is inputted from an AND circuit AND1 provided upstream most in the maximum value search unit 31. To start with, an AND circuit AND2 takes AND of a first-line binary value "10101" corresponding to MSB from VC#1 up to VC#5 in the binary number memory 33 and the ANDed result "11001".

At this time, a bit string of the ANDed result outputted from the AND circuit AND2 is "10001", and all the bits are not "0". Hence, an input from a terminal N, i.e., a bit string "10001" as the ANDed result of the first-line binary value "10101" and the ANDed result "11001" of the buffer flag value and the PCR flag value, is selected by a selector SEL1 and transmitted downstream.

Next, an AND circuit AND3 takes AND of the output value "10001" from the selector SEL1 and a second-line binary value "01110", however, bits of this ANDed result are all "0" (00000). Hence, an input from a terminal Y, i.e., a bit string transferred from the selector SEL1 is transmitted downstream as it is by a selector SEL2.

Further, an AND circuit AND4 obtains an ANDed result of a third-line binary value "01000" and the output value "10001" from the selector SEL2, wherein bits of this ANDed result are all "0". Therefore, a selector SEL3 transmits the output value "10001" inputted from the selector SEL2.

Finally, an AND circuit AND5 obtains an ANDed result of a fourth-line binary value "00011" and the output value "10001" from the selector SEL3, wherein bits of this ANDed result "00001" are not all "0". Therefore, a selector SEL4 outputs this value "00001".

The maximum value search unit 31 executes the searching process described above, thereby detecting VC#5, in which both of the buffer flag value and the PCR flag value are [1], having the maximum value ([9] of the product of the PCR interval value and the MCR counter value.

Note that the operation of detecting the maximum value given by PCR interval value×MCR counter value has been explained herein. A maximum value given by PCR interval value×(MCR counter value −1) can be also detected by the same operation other than changing the input value.

When detecting the VC having the maximum value, the maximum value search unit 31 notifies the cell reading unit 32 of a VC number of this detected VC. Then, the cell of this VC is read out of the corresponding individual VC queue VCQ. Further, the VC information control unit 30 is also notified of the VC number of the read-out target VC, and the MCR counter 6 corresponding to this VC is decremented by [1]. Moreover, when taking the second modified architecture, the PCR counter 5 is initialized to the PCR interval value.

Now, when such an operation is repeated on, the value of the MCR counter 6 corresponding to each VC is reduced stepwise. Then, it is assumed that the state transits to what the VC information memory 4, the PCR counter 5 and the MCR counter 6 are as shown in FIG. 20.

Figure 21:
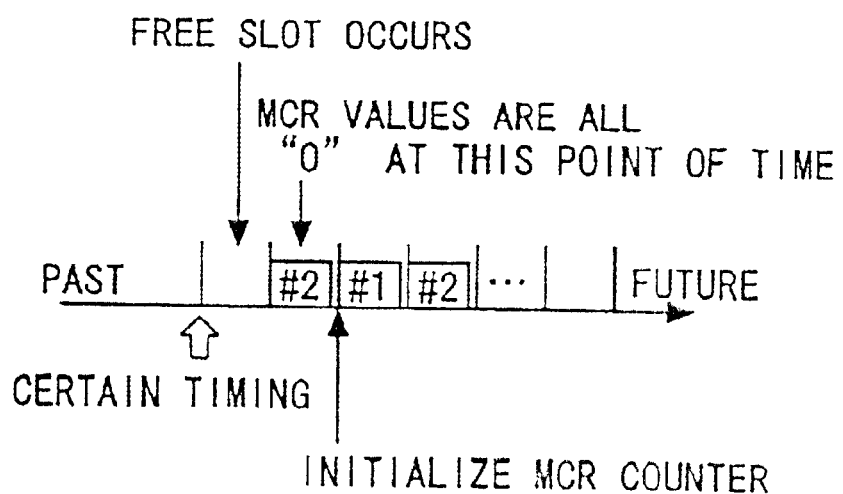
FIG. 21 is an explanatory diagram showing an MCR counter initializing method in the ATM switch taking a sixth modified architecture.

FIG. 21 shows, in time series, a method of initializing the MCR counter 6 based on the sixth modified architecture in this state. A value of the MCR counter 6 corresponding to VC#2 among the VCs having the cells in the individual VC queues VCQ of the buffer units 2, i.e., the VCs of which the buffer flags are [1], is still over [0], and hence the MCR counter 6 is not initialized at this point of time. The cell of the VC#2 can not be read out due to the PCR restriction, and therefore its slot becomes free.

Then, the PCR restriction is canceled in a next slot, and, when reading the cell of the VC#2, values of all the MCR counters 6 in which the buffer flags are [1] become [0]. Therefore, the MCR counters 6 are initialized.

Figure 22:
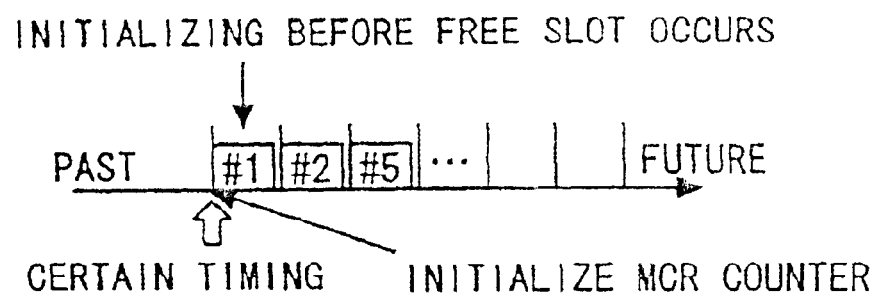
FIG. 22 is an explanatory diagram showing the MCR counter initializing method in the ATM switch taking a seventh modified architecture.

By contrast, FIG. 22 shows in time series the method of initializing the MCR counter 6 based on the seventh modified architecture. As discussed above, the value of the MCR counter 6 corresponding to VC#2 is [1], however, at this point of time the PCR restriction is set in VC#2, with the result that a free slot occurs. In such a case, even when all the cells of the VCs in which the vales of the MCR counters 6 are over [1] are not read out, the MCR counter 6 is reset, and thereafter the maximum value search unit 31 searches VC#1 in which the MCR counter 6 has the maximum value [0]. Then, the cell is read out.

Even when initializing the MCR counter 6, however, there might exist a case where the cells are not read out because of being PCR-restricted with respect to all the VCs having the cells in the individual VC queues VCQ. FIG. 23 shows one example of numerical values o the VC information memory 4 (42), the PCR counter 5 and the MCR counter 6 in this case.

Figure 24:
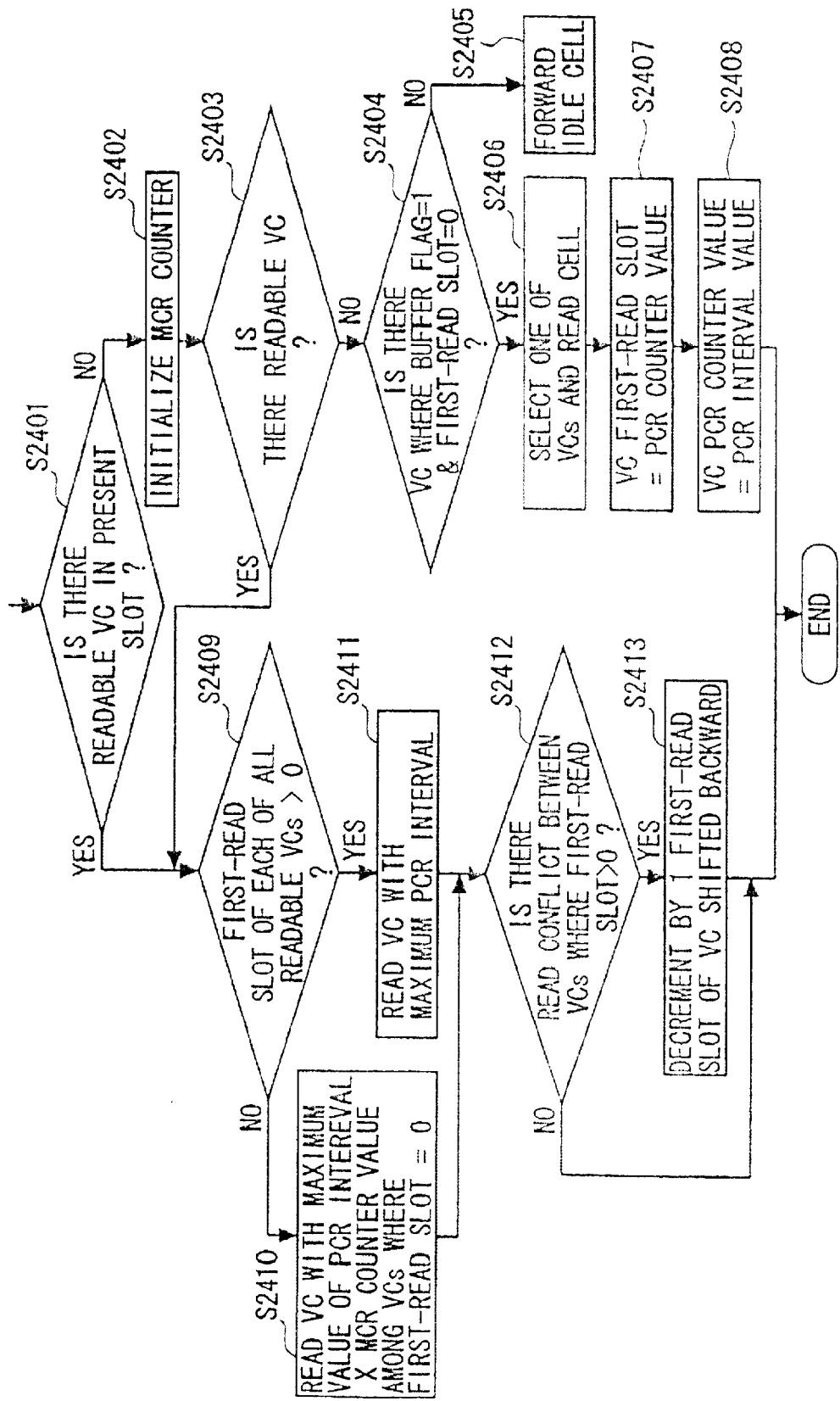
FIG. 24 is a flowchart showing processes in the ATM switch taking an eighth modified architecture.

FIG. 24 is a flowchart showing a read-out control process in a case where the eighth modified architecture is applied in such an environment. Note that the VC information control unit 30, the maximum value search unit 31 the cell read-out unit 32 of the read-out control unit 3 cooperates to execute this read-out control process.

At first, it is checked whether or not there exists the cell readable VC, i.e., the VC satisfying three conditions such as buffer flag=1, PCR flag=1 and MCR counter=1 in the present slot (processing step S2401). If not, the MCR counter 6 is initialized (S2401), and it is again checked whether or not the cell readable VC exists (S2403). If the cell readable VC does not yet exist, it is checked whether or not there exists the VC, having the cell in the individual VC queue VCQ of the buffer unit 2, in which the buffer flag of the VC information memory 4 (42) is [1] and the first-read slot is [0] (S2404).

At this time, if no relevant VC exists, an idle cell is read out in that slot (S2405). Whereas if the relevant VCs exist, one of these VCs is selected, and the cell is read out (S2406). Further, a slot value shifted forwards, i.e., the PCR counter value at the present time is substituted into the first-read slot field (S2407). Then, the PCR counter 5 corresponding to that VC is initialized to the PCR interval value (S2408).

In S2401 or S2403, if the relevant VC exists, it is checked whether or not the first-read slots corresponding to all the cell readable VCs are [1] (over [0]) (S2409). If there exist one or more VCs where the first-read slot=0, the VC having the maximum value given by PCR interval value×MCR counter value is selected therefrom (S2410). If the first-read slots are all over [1], however, the VC having the maximum PCR interval value is selected (S2411).

After executing S2410 and S2411, in any case, it is checked whether or not there exists the VC where the first-read slot value shifted backwards (towards the future in time) due to the read-out conflict exceeds [0] (S2412). If the relevant Vc exists, the first-read slot value of this VC is decremented by [1] (S2413).

[Effectivity of Packet Switch (ATM switch)]

Next, an effectivity of the ATM switch 1 described above will be explained. The ATM switch 1 taking the basic architecture described above is capable of MCR-guaranteeing and PCR-restricting the VCs having arbitrary MCR/PCR values. Further, the ATM switch 1 is effective in actualizing a high efficiency, actualizing an impartial allocation of bands based on the maximum cell rate (MCR) and reducing a burst characteristic.

Figure 25:
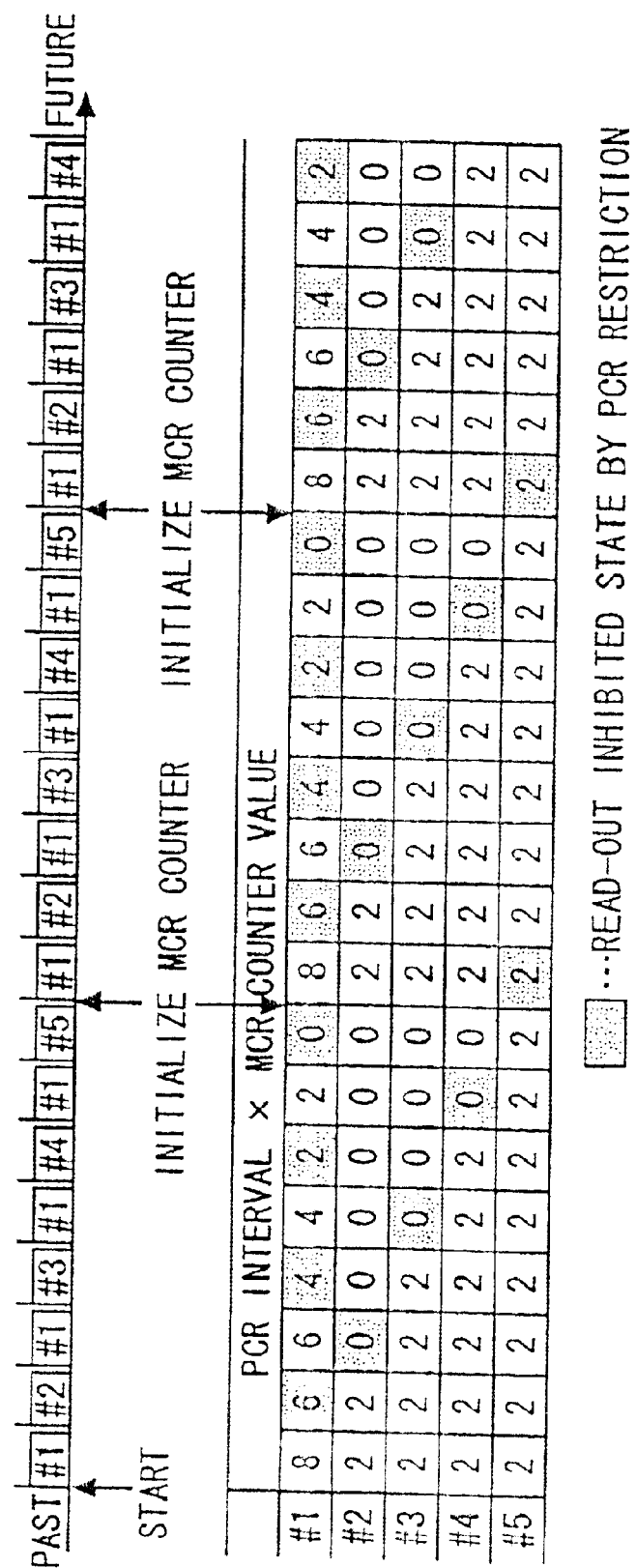
FIG. 25 is a diagram showing a time series when the ATM switch having the basic architecture is applied to the set example in FIG. 1(B)
Figure 26:
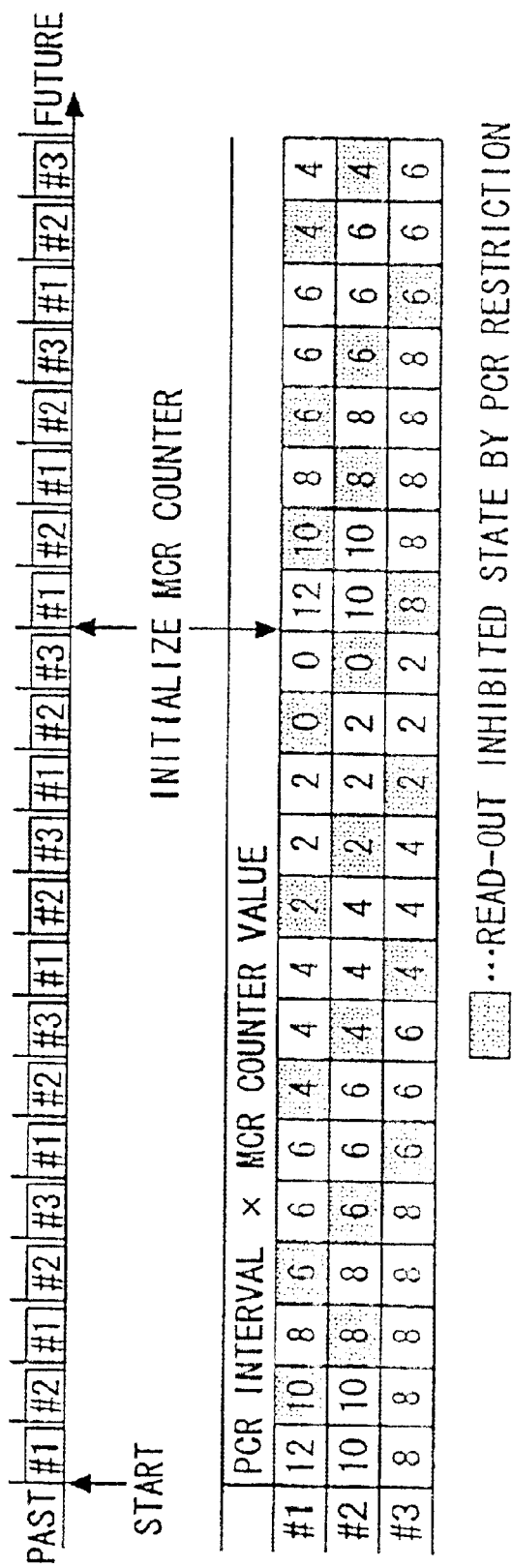
FIG. 26 is a diagram showing a time series when the ATM switch having the basic architecture is applied to the set example in FIG. 1(C)
Figure 27:
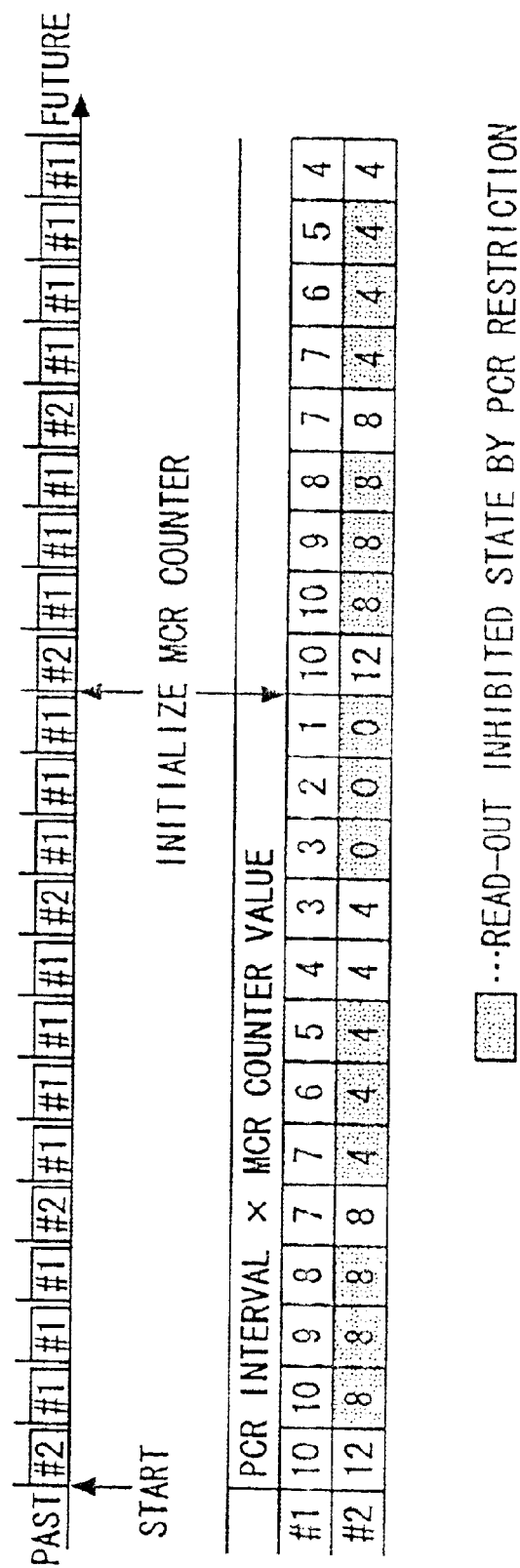
FIG. 27 is a diagram showing a time series when the ATM switch having the basic architecture is applied to the set example in FIG. 1(D)

For example, FIGS. 25, 26 and 27 show read-out time series corresponding to the conditions shown in FIGS. 1(B) through 1(D). Throughout these Figures, a lower stage shows the product of the PCR interval value and the MCR counter value of the corresponding VC in each slot, while an upper stage shows time series of the VC numbers actually read out. It can be known from these Figures that the high-efficiency read-out with no free slot can be actualized while attaining the impartiality of the maximum cell rate (MCR) in any example. The gray slot in each VC represents a read inhibited state by the PCR restriction.

Further, the memory is previously stored with the product of the PCR interval value and the MCR counter value by taking the VC information memory structure based on the first modified architecture described above, whereby it is feasible to reduce the process of calculating the product of the PCR interval value and the MCR counter value in the maximum value search unit 31.

The cell interval corresponding to the arbitrary VC is invariably larger the PCR interval by adopting the method of initializing the counter based on the second modified architecture, and hence the PCR restriction strict enough not to permit CDV (Cell Delay Variation).

Further, another method of initializing the counter based on the second modified architecture is adopted, whereby even when the read-out slot is shifted backwards if within the one OCR interval in the arbitrary VC, the flexible and highly efficient PCR restriction that restrains the cell delay variation (CVD) within one PCR interval can be attained because of making the next read-out timing earlier corresponding to the shift of the slot.

The backward shift of the slot due to the conflict can be corrected if up to (PCR interval×N) slots by adopting the PCR restriction method based on the third modified architecture described above, and hence the PCR restriction exhibiting a more flexibility and higher efficiency can be attained.

It is possible to detect the VC having the maximum value under the simple control with the scale-down hardware by adopting the maximum value search unit 31 based on the fourth modified architecture explained above.

The VC having the maximum value can be detected in an extremely short period of time from the multiplicity of VCs by adopting the maximum value search unit 31 based on the fifth modified architecture described above, although the control becomes complicated and the scale of the hardware becomes comparatively large.

With respect to the VCs having the cells in the individual VC queues VCQ of the buffer units 2, the cells are invariably read out by the number corresponding to the MCR counter value by adopting the MCR counter initializing method based on the sixth modified architecture explained above, and hence the strict impartiality of the maximum cell rate (MCR) can be actualized.

Moreover, the bands serving as the free slots can be allocated to the cell readable VCs by taking the MCR counter initializing method based on the seventh modified architecture described above, and therefore the band allocation can be done at a much higher efficiency.

The read-out control algorithm based on the eighth modified architecture is adopted, whereby the read-out position can be, though the cell delay variation (CDV) increases, shifted forwards (towards the past in time) and therefore the bands can be utilized more flexibly. Further, it may be considered that the state where there exist a multiplicity of VCs with the forward shifts, implies a state where there a comparatively less number of cell readable VCs while the cells of the VCs are read out at the PCR intervals, and, namely, the situation is that the congestion is comparatively small or does not occur. That is, a state of the congestion can be automatically judged from how large or small this first-read VC count is.

It is feasible to eliminate an influence exerted on the VCs kept in the PCR restriction from the VCs having canceled the PCR restriction by taking another read-out control algorithm based on the eighth modified architecture. Moreover, the first-read VC is treated later on, thereby yielding an effect that the read-out position can be corrected.

In the state where the congestion is comparatively small or does not occur, the read-out of the cells can be controlled at a much higher efficiency by taking still another read-out control algorithm based on the eighth modified architecture.

The effectivity produced by adopting each read-out control algorithm based on the eighth modified architecture, will be explained more specifically by giving an example of the numerical values of the VC information memory 4 (42), the PCR counter 5 and the MCR counter 6 shown in FIG. 23.

Figure 28:
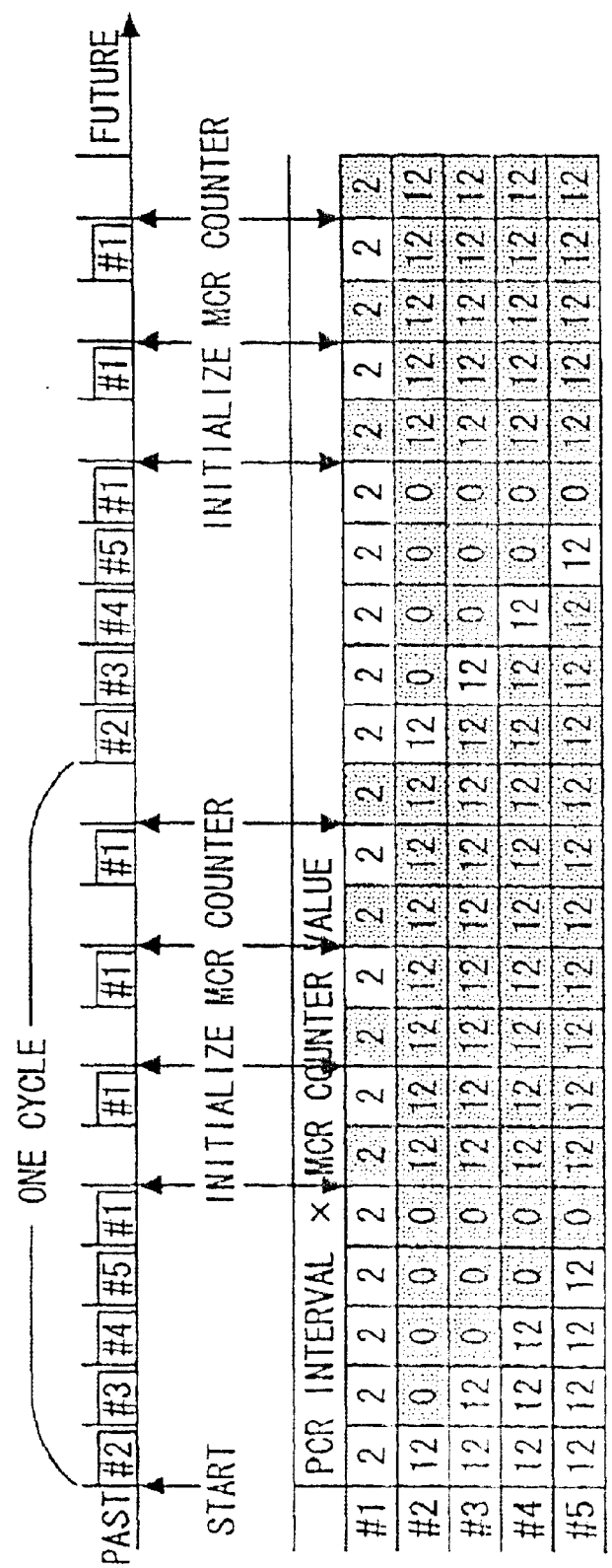
FIG. 28 is a diagram showing a time series when the ATM switch taking an eighth modified architecture is applied to the set example in FIG. 23.

FIG. 28 shows a read-out time series when not under the read-out control algorithm described above. Note that the MCR counter initializing method based on the seventh modified architecture is herein used in combination in order to emphasize the efficiency. Referring to FIG. 28, there exist the VCs with the cells that should be read out up to the fifth slot, and the cells are read out in sequence from the VC with a larger value given by PCR interval value×MCR counter value. At the sixth slot, there is no cell readable VC, and the MCR counter is herein initialized.

All the VCs are restricted in terms of the read-out process by the PCR restriction, however, eventually there might be free slots. The same action occurs at the eighth, tenth and twelfth slots. As described above, there continues the read-out process starting from the first slot down to the twelfth slot as one cycle, and hence the read-out rate of VC#1 is 4 Mbps under the peak cell rate (PCR) of 6 Mbps.

Figure 29:
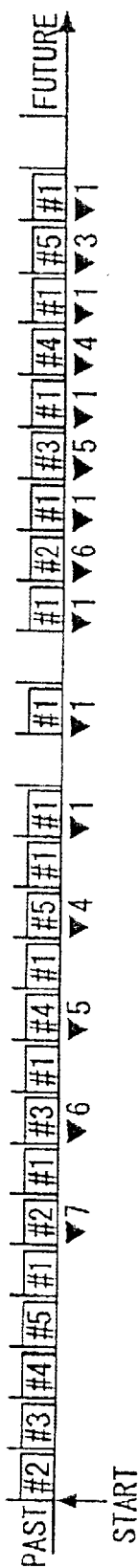
FIG. 29 is a diagram showing a time series when the ATM switch taking the eighth modified architecture is applied to the set example in FIG. 23.

On the other hand, FIG. 29 shows a time series when adopting each read-out control algorithm based on the eighth modified architecture. Note that the initialization of the MCR counter 6 is of almost no importance in FIG. 29, and therefore its explanation is omitted. FIG. 29 also shows values (indicating how many number of the first-read slots are shifted forwards) of the respective VCs below the time series area.

The same operation is carried out up to the fifth slot also in FIG. 29, however, one of the VCs with the first-read unexecuted is selected, and the cell can be thus readout. Hence, the cell of the VC#2 is read out at this point of time. The VC with the first-read executed, however, never again receives the first-read process in this state, so that the cell of that VC at the black slot in FIG. 29 is not read out.

The same first-read occurs also in the eight, tenth and twelfth slots, and the first-read of the cell of VC#1 is conducted at the fourteenth slot, whereby all the VCs are brought into the first-read state. As described above, the first-read process is never again executed from the first-read state, and hence the fifteenth slot becomes a free slot.

Further, a read-out conflict between VC#1 and VC#2 occurs at the eighteenth slot. At this time, however, every VC is in the first-read state, and therefore the priority of the read-out is given to VC#1 having a larger peak cell rate (PCR) in accordance with still another read-out control algorithm.

The same conflict occurs also at the twentieth, twenty second and twenty fourth slots, however, the VC#1 having the larger PCR is given the priority in each case. Thus, the read-out process from the fourteenth slot down to the twenty fifth slot as one cycle continues, so that the read-out rate of the VC#1 comes to 6 Mbps, whereby the read-out band corresponding to the PCR can be all used out. Note that the gray slot of each VC represents the read inhibited state due to the PCR restriction. The black slot represents a PCR read inhibited state in the first-read state.

OTHER MODIFIED EXAMPLES

First Other Modified Example

The read-out control can be selectively executed in the ATM switch 1 in accordance with the software-based control method such as switching over a mode and so on. For instance, the VC information memory 4 (41) is structured as shown in FIG. 14. In this case, an upper limit value of the number-of-times counter is set to [0], and, if trying not to initialize the PCR counter even when the PCR counter value comes to [0], one mode of PCR counter initialization based on the second modified architecture can be actualized.

Moreover, the upper limit value of the number-of-times counter is set to [1], whereby the other mode of PCR counter initialization based on the second modified architecture can be actualized. Further, when the upper limit value of the number-of-times counter is set to α, the PCR restriction in the third modified architecture can be attained.

Further, a condition that "the value of the MCR counter 6 of the active VC are all [0]", is added to the initialization conditions of the MCR counter 6, thereby attaining the MCR counter initialization in the sixth modified architecture. This condition is ruled out of the initialization conditions, thereby attaining the MCR counter initialization in the fourth modified architecture.

Thus, the read-out control can be selectively executed in the same ATM switch 1 simply by changing the setting of the software without requiring the change in the hardware.

Second Other Modified Example

Figure 30:
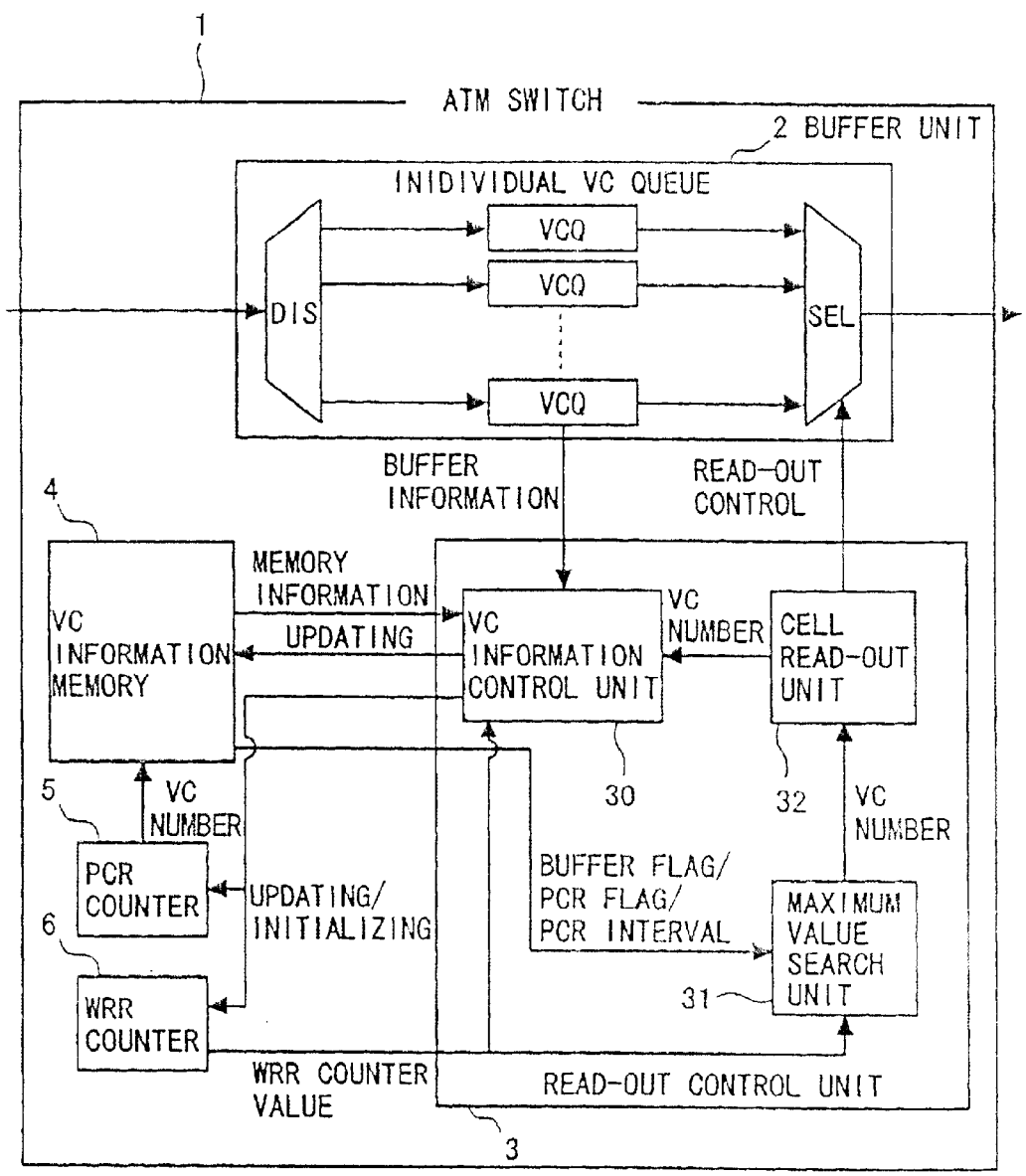
FIG. 30 is a block diagram showing other modified example of the ATM switch of the present invention.
Figure 31:
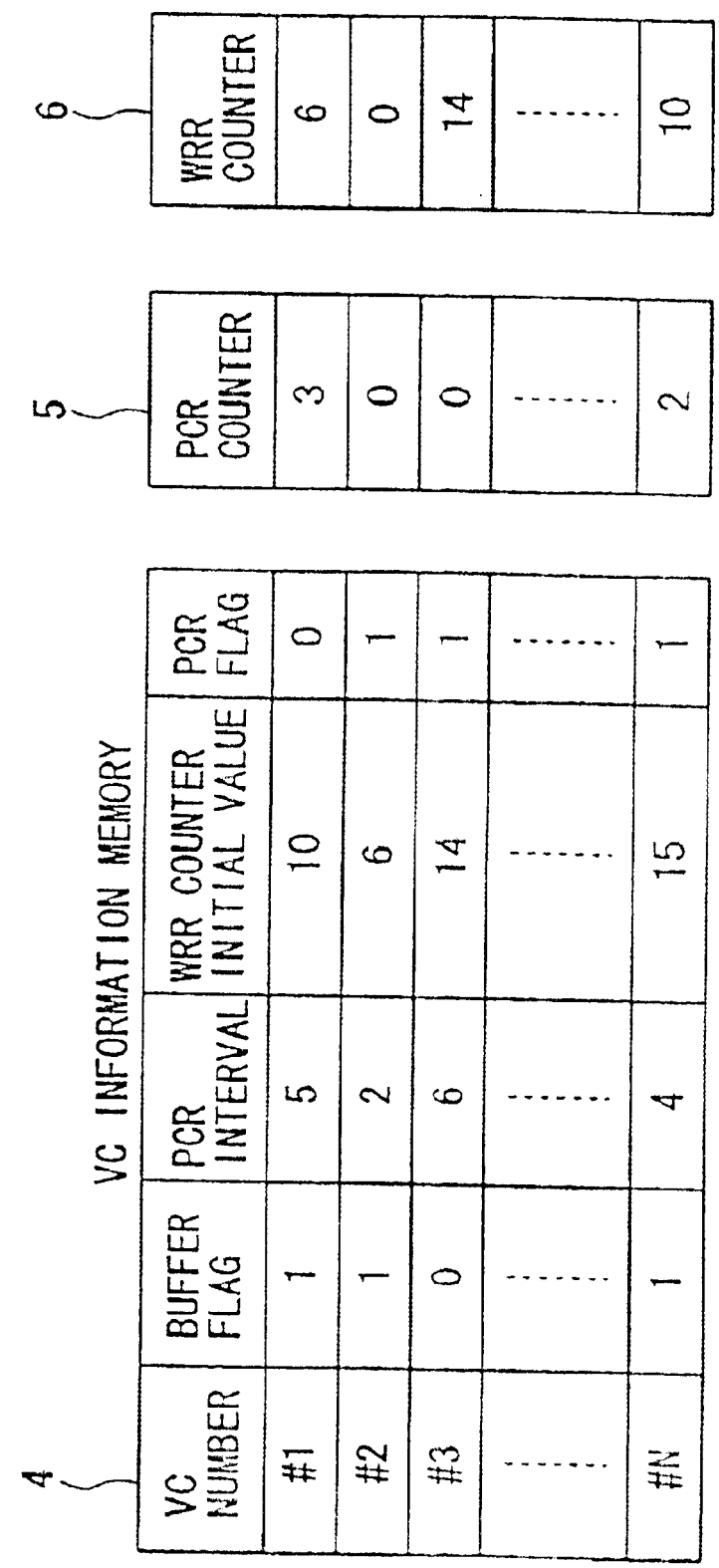
FIG. 31 is a diagram showing structures of the VC information memory, the PCR counter and the MCR counter in other modified example.

FIGS. 30 and 31 show an architecture where the ATM switch in one embodiment is applied to WRR (Weighted Round Robin). The ATM switch 1 in the second other modified example has substantially the same architecture as the ATM switch in one embodiment is configured, except that a WRR counter 7 is provided as a substitute for the MCR counter 6, and that the VC information memory 4 is stored with a WRR counter initial value.

The second other modified example is effective when applied in the ATM switch required to hold the PCR while reading the cell in accordance with a weighted rate.

The control operation is substantially the same as in the case of the MCR counter 6, the VC having the maximum value given by PCR interval value×WRR counter value or by PCR interval value×(WRR counter value −1), is set as a cell read-out target. This contrivance makes it possible to attain scheduling in which one cycle of WRR is minimized while keeping the PCR interval.

Note that the ATM switch has been exemplified in one embodiment of the present invention, however, the present invention can be embodied likewise in the packet switch for forwarding the data not in the cell format but in a fixed-length packet format. In this case, the cell read-out target virtual channel VC maybe treated as a packet read-out target connection.

Although only a few embodiments of the present invention have been described in detail above, those skilled in the art will readily appreciate that many modifications are possible in the preferred embodiments without departing from the novel teachings and advantages of this invention. Accordingly, all such modifications are intended to be included within the scope of the present invention as defined by the following claims.

What is claimed is:

1. A packet switch comprising:
   a memory unit for storing a flag for indicating a state of existence of a packet in a buffer memory, a peak cell rate packet interval value for restricting a read-out rate to a peak cell rate or under, and a minimum cell rate counter initial value expressed as a minimum cell rate in a way of making these parameters corresponding to every connection;
   a peak cell rate counter unit decremented by a predetermined value at every packet read-out timing with the peak cell rate packet interval value serving as an initial value;
   a minimum cell rate counter unit for retaining a value of a corresponding connection, which is decremented by a predetermined value each time the packet is read out of said buffer memory; and
   a read-out control unit for detecting, based on the flag, that the packet exists in said buffer memory when the packet read-out timing is reached, and setting as a read-out target the packet corresponding to a connection exhibiting a maximum value of product of the maximum cell rate packet interval value and a value retained in said minimum cell rate counter unit at that timing from at least one or more connections receiving no peak cell rate restriction, which is detected based on the maximum cell rate packet interval value.

2. A packet switch comprising:
   a memory unit for storing a flag for indicating a state of existence of a packet in a buffer memory, a peak cell rate packet interval value for restricting a read-out rate to a peak cell rate or under, and a minimum cell rate counter initial value expressed as a minimum cell rate in a way of making these parameters correspond to every connection;
   a peak cell rate counter unit decremented by a predetermined value at every packet read-out timing with the peak cell rate packet interval value serving as an initial value;
   a minimum cell rate counter unit for retaining a value of a corresponding connection, which is decremented by a predetermined value each time the packet is read out of said buffer memory; and
   a read-out control unit for detecting, based on the flag, that the packet exists in said buffer memory when the packet read-out timing is reached, and setting as a read-out target the packet corresponding to a connection exhibiting a maximum value of product of the maximum cell rate packet interval value and a value obtained by decrementing a value retained in said minimum cell rate counter unit by 1 at that timing from at least one or more connections receiving no peak cell rate restriction, which is detected based on the maximum cell rate packet interval value.

3. A packet switch comprising:
   a memory unit for storing a flag for indicating a state of existence of a packet in a buffer memory, a peak cell rate packet interval value for restricting a read-out rate to a peak cell rate or under, and a product initial value of a product of the peak cell rate packet interval value and a minimum cell rate counter initial value expressed as a minimum cell rate in a way of making these parameters correspond to every connection;
   a peak cell rate counter unit decremented by a predetermined value at every packet read-out timing with the peak cell rate packet interval value serving as an initial value;
   a product decrement counter unit for retaining a value of a corresponding connection, which is decremented by the peak cell rate packet interval value each time the packet is read out of said buffer memory, with the product initial value serving as an initial value; and
   a read-out control unit for detecting, based on the flag, that the packet exists in said buffer memory when the packet read-out timing is reached, and setting as a read-out target the packet corresponding to a connection exhibiting a maximum value of the value retained in said product decrement counter unit from at least one or more connections receiving no peak cell rate restriction, which is detected based on the maximum cell rate packet interval value.

4. A packet switch according to claim 1, 2 or 3, wherein said read-out control unit sets a packet read-out timing as an initialization timing of said peak cell rate counter unit corresponding to the read-out connection.

5. A packet switch according to claim 1, 2 or 3, wherein said read-out control unit sets a point of time when said peak cell rate counter unit comes to its expiration as an initialization timing of said peak cell rate counter unit.

6. A packet switch according to claim 1, 2 or 3, further comprising a counter unit incremented by a predetermined value each time said peak cell rate counter unit comes to its expiration and decremented by the predetermined value each time a packet of a corresponding connection is read out, for setting a predetermined peak cell rate restriction value as an upper limit value,
   wherein said read-out control unit permits the read-out of the packet if a value retained by said counter unit is equal to or larger than a predetermined value.

7. A packet switch according to claim 1 or 2, wherein said read-out control unit includes a search unit for detecting a connection exhibiting a maximum value by comparing a product of the peak cell rate packet interval value and the value retained by said minimum cell rate counter unit at that timing in sequence with respect to all connections with the packet existing in said buffer memory and receiving no peak cell rate restriction.

8. A packet switch according to claim 1 or 2, further comprising a memory unit for storing in a binary number form a product of the peak cell rate packet interval value and the value retained in said minimum cell rate counter unit per connection,
   wherein said read-out control unit includes a search unit for detecting a connection exhibiting a maximum value by executing, in sequence from a most significant bit down to a least significant bit, an operation of simultaneously searching a bit ON-state and a bit OFF-state of the same digit with respect to all the connections that have the packets in said buffer memories and are not subjected to the peak cell rate restriction.

9. A packet switch according to claim 1 or 2, wherein said read-out control unit, if there exists no connection satisfying two conditions that the packet exists in said buffer memory and that the value retained in said minimum cell rate counter unit is equal to or larger than a predetermined value, initializes said minimum cell rate counter units corresponding to all the connections.

10. A packet switch according to claim 1 or 2, wherein said read-out control unit, if there exists no connection satisfying three conditions that the packet exists in said buffer memory, that the value retained in said minimum cell rate counter unit is equal to or larger than a predetermined value and that the connection does not receive the peak cell rate restriction, initializes said minimum cell rate counter units corresponding to all the connections.

11. A packet switch according to claim 9, wherein said read-out control unit, after initializing said minimum cell rate counter unit, if there exists no connection in which the packet can be read out, further selects one of the connections with the packets existing in said buffer memories and kept in the peak cell rate restriction, and makes the packets readable by canceling the peak cell rate restriction.

12. A packet switch according to claim 11, wherein said read-out control unit, if a read-out conflict between the connection kept in the peak cell rate restriction and the connection with the packet read first by canceling the peak cell rate restriction occurs at the same timing, gives a read-out priority to the packet corresponding to the connection kept in the peak cell rate restriction.

13. A packet switch according to claim 11, wherein said read-out control unit, if the read-out conflict between the connections with the packets read first by canceling the peak cell rate restriction occurs at the same timing, gives the read-out priority to the packet corresponding to the connection having a larger peak cell rate packet interval value.

14. A packet switch comprising:
- a memory unit for storing a flag for indicating a state of existence of a packet in a buffer memory, a peak cell rate packet interval value for restricting a read-out rate to a peak cell rate or under, and a Weighted Round Robin (WRR) counter initial value obtained by weighting the minimum cell rate in a way of making these parameters correspond to every connection;
- a peak cell rate counter unit decremented by a predetermined value at every packet read-out timing with the peak cell rate packet interval value serving as an initial value;
- a WRR counter unit for retaining a value of a corresponding connection, which is decremented by a predetermined value each time the packet is read out of said buffer memory; and
- a read-out control unit for detecting, based on the flag, that the packet exists in said buffer memory when the packet read-out timing is reached, and setting as a read-out target the packet corresponding to a connection exhibiting a maximum value of product of the peak cell rate packet interval value and the value retained in said WRR counter unit at that timing from at least one or more connections receiving no peak cell rate restriction, which is detected based on the maximum cell rate packet interval value.

15. A packet switch comprising:
- a memory unit for storing a flag for indicating a state of existence of a packet in a buffer memory, a peak cell rate packet interval value for restricting a read-out rate to a peak cell rate or under, and a Weighted Round Robin (WRR) counter initial value obtained by weighting the minimum cell rate in a way of making these parameters correspond to every connection;
- a peak cell rate counter unit decremented by a predetermined value at every packet read-out timing with the peak cell rate packet interval value serving as an initial value;
- a WRR counter unit for retaining a value of a corresponding connection, which is decremented by a predetermined value each time the packet is read out of said buffer memory; and
- a read-out control unit for detecting based on the flag that the packet exists in said buffer memory when the packet read-out timing is reached, and setting as a read-out target the packet corresponding to a connection exhibiting a maximum value of product of the peak cell rate packet interval value and a value obtained by decrementing the value retained in said WRR counter unit by 1 at that timing from at least one or more connections receiving no peak cell rate restriction, which is detected based on the maximum cell rate packet interval value.

* * * * *